US010140891B2

(12) United States Patent
Kian et al.

(10) Patent No.: US 10,140,891 B2
(45) Date of Patent: *Nov. 27, 2018

(54) ACTIVATABLE ADHESIVE, LABELS, AND RELATED METHODS

(71) Applicant: Avery Dennison Corporation, Glendale, CA (US)

(72) Inventors: Kourosh Kian, Altadena, CA (US); Sou Phong Lee, Arcadia, CA (US); Dong-Tsai Hseih, Arcadia, CA (US); David N. Edwards, Pasadena, CA (US); Johannes Lenkl, Freising (DE); Rishikesh K. Bharadwaj, Temple City, CA (US); Prakash Mallya, Sierra Madre, CA (US); Kai Li, Diamond Bar, CA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,364

(22) Filed: May 10, 2017

(65) Prior Publication Data

US 2017/0240775 A1 Aug. 24, 2017

Related U.S. Application Data

(60) Continuation of application No. 13/892,443, filed on May 13, 2013, now Pat. No. 9,653,006, which is a (Continued)

(51) Int. Cl.
 *G09F 3/10* (2006.01)
 *G09F 3/02* (2006.01)
 (Continued)

(52) U.S. Cl.
 CPC .............. *G09F 3/10* (2013.01); *C09J 7/0203* (2013.01); *C09J 7/29* (2018.01); *C09J 7/35* (2018.01);
 (Continued)

(58) Field of Classification Search
 None
 See application file for complete search history.

(56) References Cited

U.S. PATENT DOCUMENTS 2,304,787 A  12/1942 Avery
2,524,945 A  10/1950 Von Hofe
(Continued)

FOREIGN PATENT DOCUMENTS

CN  101180376  5/2005
CN  200957678  10/2007
(Continued)

OTHER PUBLICATIONS

Delayed Action Adhesives, Application Focus—Omnexus 4 Adhesives, by SpecialChem, dated Jun. 16, 2006, printed from www.omnexus4adhesives.com.
(Continued)

*Primary Examiner* — Frank D Ducheneaux
(74) *Attorney, Agent, or Firm* — Avery Dennison Corporation

(57) ABSTRACT

An activatable adhesive that is formulated to readily absorb energy from a given radiation source, an activatable adhesive label that incorporates such an activatable adhesive, a system for activating such labels, and related methods and uses are described. The activatable adhesive includes a plasticizer, a tackifier, and an adhesive base polymer that includes butyl acrylate, styrene, methyl methacrylate, methacrylic acid, and acrylic acid.

15 Claims, 19 Drawing Sheets

Related U.S. Application Data division of application No. 13/119,006, filed as application No. PCT/US2010/047428 on Sep. 1, 2010, now Pat. No. 9,200,186, which is a continuation-in-part of application No. 12/561,349, filed on Sep. 17, 2009, now abandoned.

(60) Provisional application No. 61/097,822, filed on Sep. 17, 2008.

(51) Int. Cl.

| | | |
|---|---|---|
| *C09J 133/02* | (2006.01) | |
| *C09J 133/08* | (2006.01) | |
| *C09J 133/10* | (2006.01) | |
| *C09J 125/14* | (2006.01) | |
| *C09J 7/35* | (2018.01) | |
| *C09J 7/29* | (2018.01) | |
| *C08K 3/013* | (2018.01) | |
| *C08K 3/04* | (2006.01) | |
| *C08K 5/10* | (2006.01) | |
| *C08K 5/12* | (2006.01) | |
| *C09J 7/02* | (2006.01) | |
| *C09J 7/38* | (2018.01) | |
| *C08K 5/00* | (2006.01) | |

(52) U.S. Cl.
CPC .............. *C09J 7/385* (2018.01); *C09J 125/14* (2013.01); *C09J 133/02* (2013.01); *C09J 133/08* (2013.01); *C09J 133/10* (2013.01); *G09F 3/02* (2013.01); *C08K 3/013* (2018.01); *C08K 3/04* (2013.01); *C08K 5/0016* (2013.01); *C08K 5/10* (2013.01); *C08K 5/12* (2013.01); *C09J 2203/334* (2013.01); *C09J 2205/102* (2013.01); *C09J 2205/106* (2013.01); *C09J 2400/163* (2013.01); *C09J 2400/226* (2013.01); *C09J 2400/283* (2013.01); *C09J 2433/00* (2013.01); *G09F 2003/0201* (2013.01); *G09F 2003/025* (2013.01); *G09F 2003/0241* (2013.01); *Y10T 428/24355* (2015.01); *Y10T 428/28* (2015.01); *Y10T 428/2813* (2015.01); *Y10T 428/2843* (2015.01); *Y10T 428/2848* (2015.01); *Y10T 428/2891* (2015.01)

(56) References Cited

U.S. PATENT DOCUMENTS

| | | |
|---|---|---|
| 2,525,471 A | 10/1950 | Balzer |
| 2,569,140 A | 9/1951 | Avery |
| 2,676,726 A | 4/1954 | Von Hofe |
| 2,783,172 A | 2/1957 | Avery |
| 3,247,041 A | 4/1966 | Henderson |
| 3,461,014 A | 8/1969 | James |
| 3,803,100 A | 4/1974 | Izumi et al. |
| 3,850,725 A | 11/1974 | Spielau et al. |
| 4,135,033 A | 1/1979 | Lawton |
| 4,156,626 A | 5/1979 | Souder |
| 4,248,748 A | 2/1981 | McGrath et al. |
| 4,280,942 A | 7/1981 | Green |
| 4,427,744 A | 1/1984 | Hume, III |
| 4,468,274 A | 8/1984 | Adachi |
| 4,522,870 A | 6/1985 | Esmay |
| 4,590,497 A | 5/1986 | Shibata et al. |
| 4,642,321 A | 2/1987 | Schoenberg et al. |
| 4,707,211 A | 11/1987 | Shibata |
| 4,745,026 A | 5/1988 | Tsukahara et al. |
| 4,784,714 A | 11/1988 | Shibata |
| 4,833,023 A | 5/1989 | Tsukahara et al. |
| 4,880,683 A | 11/1989 | Stow |
| 4,923,919 A | 5/1990 | Frazee |
| 5,240,755 A | 8/1993 | Zimmer |
| 5,252,393 A | 10/1993 | Kagota et al. |
| 5,326,644 A | 7/1994 | Scholz et al. |
| 5,421,933 A | 6/1995 | Nedblake |
| 5,464,692 A | 11/1995 | Huber |
| 5,478,807 A | 12/1995 | Cronin et al. |
| 5,480,502 A | 1/1996 | Rello et al. |
| 5,487,807 A | 1/1996 | Nedblake et al. |
| 5,569,515 A | 10/1996 | Rice, II et al. |
| 5,648,425 A | 7/1997 | Everaerts et al. |
| 5,674,345 A | 10/1997 | Nash |
| 5,702,771 A | 12/1997 | Shipston et al. |
| 5,725,719 A | 3/1998 | Szczepaniec et al. |
| 5,749,990 A | 5/1998 | Rello et al. |
| 5,768,991 A | 6/1998 | Cless et al. |
| 5,814,685 A | 9/1998 | Satake et al. |
| 5,895,552 A | 4/1999 | Matsuguchi |
| 5,895,801 A | 4/1999 | Lee |
| 5,922,169 A | 7/1999 | Chodacki et al. |
| 5,964,975 A | 10/1999 | Hinton |
| 6,006,808 A | 12/1999 | Ewert et al. |
| 6,024,822 A | 2/2000 | Alper et al. |
| 6,027,598 A | 2/2000 | Anderson |
| 6,031,553 A | 2/2000 | Nagamoto et al. |
| 6,043,190 A | 3/2000 | Ichikawa et al. |
| 6,053,231 A | 4/2000 | Matsuguchi |
| 6,066,688 A | 5/2000 | Samonides, Sr. |
| 6,080,480 A | 6/2000 | Shiba et al. |
| 6,084,010 A | 7/2000 | Baetzold et al. |
| 6,103,316 A | 8/2000 | Tran et al. |
| 6,124,032 A | 9/2000 | Bloch et al. |
| 6,139,932 A | 10/2000 | Kline |
| 6,172,698 B1 | 1/2001 | Iwata et al. |
| 6,191,382 B1 | 2/2001 | Damikolas |
| 6,206,071 B1 | 3/2001 | Majkrzak et al. |
| 6,388,692 B1 | 5/2001 | Iwata et al. |
| 6,294,038 B1 | 9/2001 | Majkrzak |
| 6,298,894 B1 | 10/2001 | Nagamoto et al. |
| 6,326,450 B1 | 12/2001 | Shipston et al. |
| 6,368,449 B1 | 4/2002 | Scott et al. |
| 6,401,787 B1 | 6/2002 | Tsutsumi et al. |
| 6,461,706 B1 | 10/2002 | Freedman et al. |
| 6,471,802 B1 | 10/2002 | Williamson |
| 6,485,803 B1 | 11/2002 | Bright |
| 6,491,080 B2 | 12/2002 | Tasma |
| 6,492,019 B1 | 12/2002 | Shipston et al. |
| 6,500,536 B1 | 12/2002 | Yamada et al. |
| 6,501,495 B1 | 12/2002 | Ichikawa et al. |
| 6,514,373 B1 | 2/2003 | Hill, IV et al. |
| 6,525,129 B1 | 2/2003 | Su et al. |
| 6,540,865 B1 | 4/2003 | Miekka et al. |
| 6,552,118 B2 | 4/2003 | Fujita et al. |
| 6,558,790 B1 * | 5/2003 | Holguin ............... C09J 4/00 428/317.1 |
| 6,559,234 B1 | 5/2003 | Arai et al. |
| 6,586,510 B1 | 7/2003 | Brown et al. |
| 6,590,019 B2 | 7/2003 | Dheret et al. |
| 6,624,273 B1 | 9/2003 | Everaerts et al. |
| 6,686,033 B1 | 2/2004 | Chacko |
| 6,726,796 B2 | 4/2004 | Erickson et al. |
| 6,731,319 B2 | 5/2004 | Masanaka |
| 6,734,256 B1 | 5/2004 | Everaerts et al. |
| 6,767,102 B1 | 7/2004 | Heenan et al. |
| 6,803,100 B1 | 10/2004 | Hintz et al. |
| 6,806,320 B2 | 10/2004 | Everaerts et al. |
| 6,828,017 B2 | 12/2004 | Kugo et al. |
| 6,863,104 B2 | 3/2005 | Okayasu et al. |
| 6,877,917 B2 | 4/2005 | Shinichi |
| 6,893,717 B1 | 5/2005 | Tsai et al. |
| 6,899,155 B2 | 5/2005 | Francke et al. |
| 6,905,269 B2 | 6/2005 | Hansburg |
| 6,916,130 B1 | 7/2005 | Holt et al. |
| 6,989,191 B2 | 1/2006 | Weissgerber et al. |
| 7,021,214 B2 | 4/2006 | Kugo et al. |
| 7,026,047 B2 | 4/2006 | Krolzig |
| 7,029,549 B1 | 4/2006 | Von Falkenhausen et al. |
| 7,051,944 B2 | 5/2006 | Weisz et al. |
| 7,070,051 B2 * | 7/2006 | Kanner ............ A61B 17/06133 206/382 |

(56) References Cited

U.S. PATENT DOCUMENTS

| | | |
|---|---|---|
| 7,084,209 B2 | 8/2006 | Everaerts et al. |
| 7,101,100 B2 | 9/2006 | Hoshino |
| 7,102,658 B2 | 9/2006 | Sanbongi et al. |
| 7,121,311 B2 | 10/2006 | VanderSyde et al. |
| 7,239,592 B2 | 7/2007 | Graffouliere |
| 7,365,763 B2 | 4/2008 | Takahashi et al. |
| 7,452,595 B2 | 11/2008 | Goto et al. |
| 7,478,956 B2 | 1/2009 | Goto et al. |
| 7,618,705 B2 * | 11/2009 | Tabata ............... B32B 7/12 428/355 BL |
| 7,651,759 B2 | 1/2010 | Lahti et al. |
| 7,655,294 B2 | 2/2010 | Lahti et al. |
| 7,767,294 B2 | 8/2010 | Cooper |
| 7,808,517 B2 | 10/2010 | Sambongi et al. |
| 7,811,404 B2 | 10/2010 | Wade et al. |
| 7,833,369 B2 | 11/2010 | Zhou et al. |
| 8,445,104 B2 | 5/2013 | Vigunas et al. |
| 2001/0028959 A1 | 10/2001 | Centner et al. |
| 2001/0035406 A1 | 11/2001 | Ryan et al. |
| 2002/0168212 A1 | 11/2002 | Nedblake et al. |
| 2002/0169233 A1 | 11/2002 | Schwantes |
| 2003/0041963 A1 | 3/2003 | Gong et al. |
| 2003/0067099 A1 | 4/2003 | Miller et al. |
| 2003/0089452 A1 | 5/2003 | Hansen et al. |
| 2003/0129431 A1 | 7/2003 | Nowak et al. |
| 2003/0143423 A1 | 7/2003 | McCormick et al. |
| 2003/0197776 A1 | 10/2003 | Darfler et al. |
| 2003/0203214 A1 | 10/2003 | Bell et al. |
| 2003/0226642 A1 | 12/2003 | Okayasu et al. |
| 2004/0004656 A1 | 1/2004 | Sambongi et al. |
| 2004/0081500 A1 | 4/2004 | Hoshino et al. |
| 2004/0092632 A1 | 5/2004 | Schultz et al. |
| 2004/0123955 A1 | 7/2004 | Kramer et al. |
| 2004/0146729 A1 * | 7/2004 | Ahmed ............... B32B 27/12 428/500 |
| 2004/0163754 A1 | 8/2004 | Nowicki et al. |
| 2004/0166309 A1 | 8/2004 | Gong et al. |
| 2004/0219379 A1 | 11/2004 | Okutani et al. |
| 2004/0244913 A1 | 12/2004 | Mitchell et al. |
| 2005/0084640 A1 | 4/2005 | Bilodeau et al. |
| 2005/0095370 A1 | 5/2005 | Ellis et al. |
| 2005/0139323 A1 | 6/2005 | Syde et al. |
| 2005/0230481 A1 | 10/2005 | Weisz et al. |
| 2005/0266194 A1 | 12/2005 | Peters |
| 2005/0276938 A1 | 12/2005 | McCormick et al. |
| 2006/0024122 A1 | 2/2006 | Nealon et al. |
| 2006/0100299 A1 | 5/2006 | Malik et al. |
| 2007/0074809 A1 | 4/2007 | Phillips |
| 2007/0267146 A1 | 11/2007 | Vigunas et al. |
| 2008/0081868 A1 | 4/2008 | Jiang et al. |
| 2008/0247940 A1 | 10/2008 | Toda |
| 2009/0047514 A1 | 2/2009 | Allen et al. |
| 2009/0050268 A1 | 2/2009 | Goto et al. |
| 2009/0124150 A1 | 5/2009 | Covelli et al. |
| 2009/0165942 A1 | 7/2009 | Nowicki et al. |
| 2009/0169282 A1 | 7/2009 | Keeton et al. |
| 2009/0229734 A1 | 9/2009 | Bernhard et al. |
| 2009/0252980 A1 | 10/2009 | Berg et al. |
| 2010/0183995 A1 | 7/2010 | Shuji |
| 2010/0273017 A1 | 10/2010 | Files |
| 2010/0277561 A1 | 11/2010 | Miles et al. |
| 2010/0300616 A1 | 12/2010 | Mitchell |
| 2011/0041998 A1 | 2/2011 | Mitchell |
| 2011/0048632 A1 | 3/2011 | Mitchell |
| 2011/0061802 A1 | 3/2011 | Raming |
| 2011/0117362 A1 | 5/2011 | Yoshida et al. |
| 2011/0205326 A1 | 8/2011 | Roth et al. |
| 2013/0133532 A1 | 5/2013 | Kian et al. |
| 2013/0133824 A1 | 5/2013 | Kian et al. |

FOREIGN PATENT DOCUMENTS

| | | |
|---|---|---|
| CN | 101147183 | 3/2008 |
| CN | 101396883 A | 4/2009 |
| CN | 201258438 | 6/2009 |
| CN | 201270114 | 7/2009 |
| CN | 201336109 | 10/2009 |
| CN | 201406398 | 2/2010 |
| CN | 101681568 | 3/2010 |
| CN | 101688090 | 3/2010 |
| CN | 201662968 | 12/2010 |
| CN | 201689603 | 12/2010 |
| CN | 201725497 | 1/2011 |
| CN | 201751926 | 2/2011 |
| CN | 201788649 | 4/2011 |
| CN | 201804499 | 4/2011 |
| CN | 102097034 | 6/2011 |
| CN | 201927278 | 8/2011 |
| CN | 201998495 | 10/2011 |
| CN | 202071775 | 12/2011 |
| CN | 202084247 | 12/2011 |
| CN | 202163232 | 3/2012 |
| CN | 101396883 B | 10/2012 |
| EA | 200601627 | 6/2007 |
| EP | 0083499 | 7/1983 |
| EP | 0180811 | 5/1986 |
| EP | 0121430 | 8/1988 |
| EP | 0782475 | 5/1998 |
| EP | 0781198 | 6/1998 |
| EP | 0950511 | 10/1999 |
| EP | 0989162 | 3/2000 |
| EP | 1447333 | 2/2004 |
| EP | 1406230 | 4/2004 |
| EP | 1163308 | 10/2004 |
| EP | 1085069 | 12/2004 |
| EP | 1591507 | 1/2006 |
| EP | 1144534 B1 | 3/2006 |
| EP | 1839293 | 10/2007 |
| EP | 1876212 | 1/2008 |
| EP | 1884771 | 2/2008 |
| EP | 2072597 | 6/2009 |
| EP | 1560861 | 9/2011 |
| EP | 1144534 B2 | 3/2013 |
| GB | 1102244 | 2/1968 |
| GB | 2405396 | 3/2005 |
| JP | 56106984 | 8/1981 |
| JP | 1207372 | 8/1989 |
| JP | 04031481 | 2/1992 |
| JP | 06017018 | 3/1994 |
| JP | 06314062 | 11/1994 |
| JP | 07092912 | 4/1995 |
| JP | 07145352 | 6/1995 |
| JP | 10258477 | 9/1998 |
| JP | 2001-088814 | 4/2001 |
| JP | 2004026882 | 1/2004 |
| JP | 2005002313 | 1/2005 |
| JP | 2006160796 | 6/2006 |
| JP | 2010237322 | 10/2010 |
| JP | 4708007 | 6/2011 |
| WO | WO94/003550 | 2/1994 |
| WO | WO1997/012010 | 4/1997 |
| WO | WO2000/056830 | 9/2000 |
| WO | WO2002/034853 | 5/2002 |
| WO | WO2003/031488 | 6/2004 |
| WO | WO2005/000482 | 1/2005 |
| WO | WO2006/076327 | 7/2006 |
| WO | WO2008/075652 | 6/2008 |
| WO | WO2008/057926 | 9/2008 |
| WO | WO2009/023537 | 2/2009 |
| WO | WO2009/041920 | 4/2009 |
| WO | WO2009/071499 | 6/2009 |
| WO | WO2013/082095 | 6/2013 |
| WO | WO2013/082101 | 6/2013 |

OTHER PUBLICATIONS

Handbook of Pressure Sensitive Adhesives Technology (2nd Edition), D. Satas, ed. (1989), pp. 172-176.

Sigma-Aldrich Data Sheet (2014).

International Search Report and Written Opinion issued in corresponding International Application No. PCT/US2010/047428 dated Aug. 8, 2011.

(56) References Cited

OTHER PUBLICATIONS

International Preliminary Report on Patentability issued in corresponding International Application No. PCT/US2010/047428 dated Mar. 29, 2012.
Invitation to Pay Additional Fees issued in corresponding International Application No. PCT/US2010/047428 dated Mar. 23, 2011.
Invitation to Pay Additional Fees issued in corresponding International Application No. PCT/US2012/066771 dated Mar. 15, 2013.
International Search Report and Written Opinion issued in corresponding International Application No. PCT/US2012/066771 dated Jun. 5, 2013.
International Preliminary Report on Patentability issued in corresponding International Application No. PCT/US2012/066771 dated Jun. 12, 2014.
Invitation to Pay Additional Fees issued in corresponding International Application No. PCT/US2012/066777 dated Mar. 15, 2013.
International Search Report and Written Opinion issued in corresponding International Application No. PCT/US2012/066777 dated Sep. 25, 2013.
International Preliminary Report on Patentability issued in corresponding International Application No. PCT/US2012/066777 dated Jun. 12, 2014.

* cited by examiner

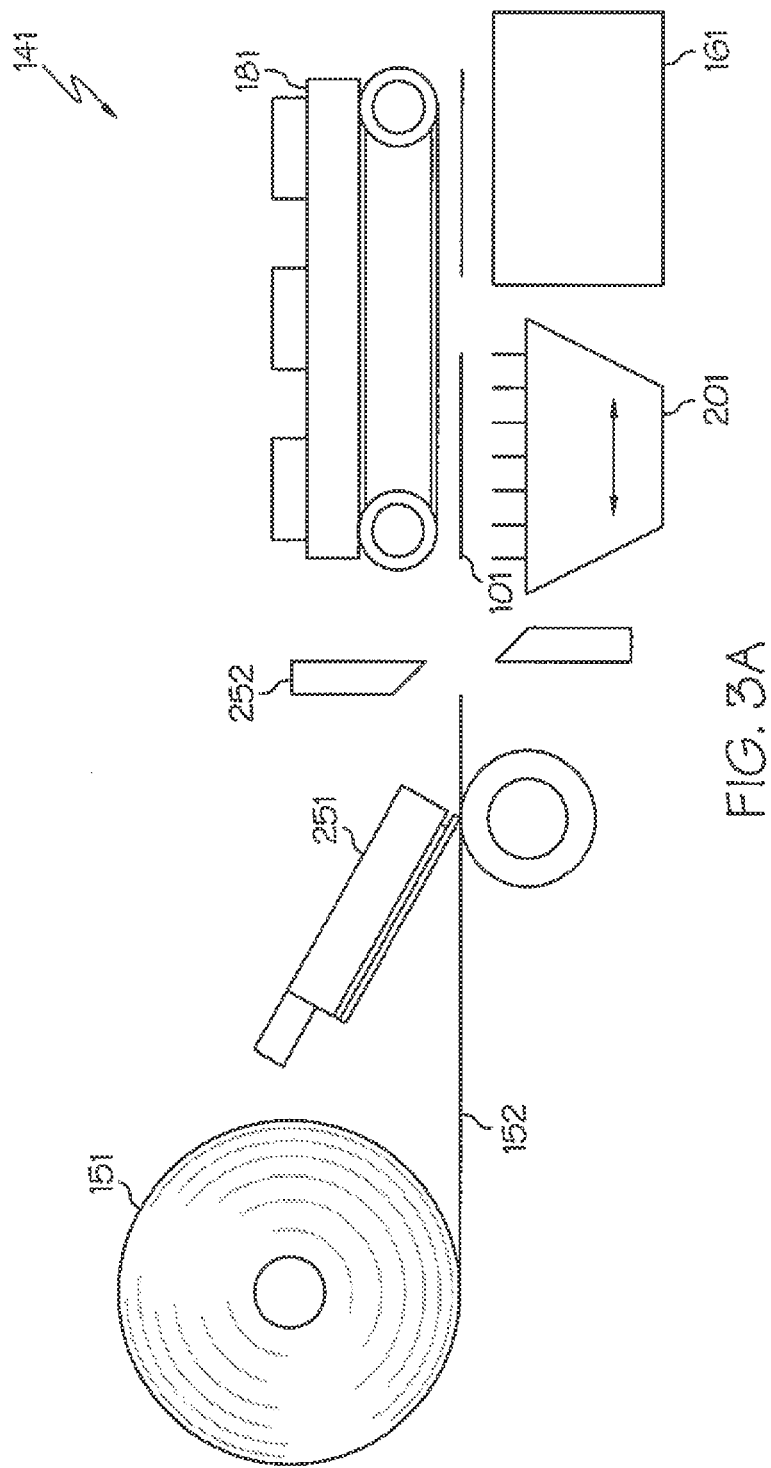

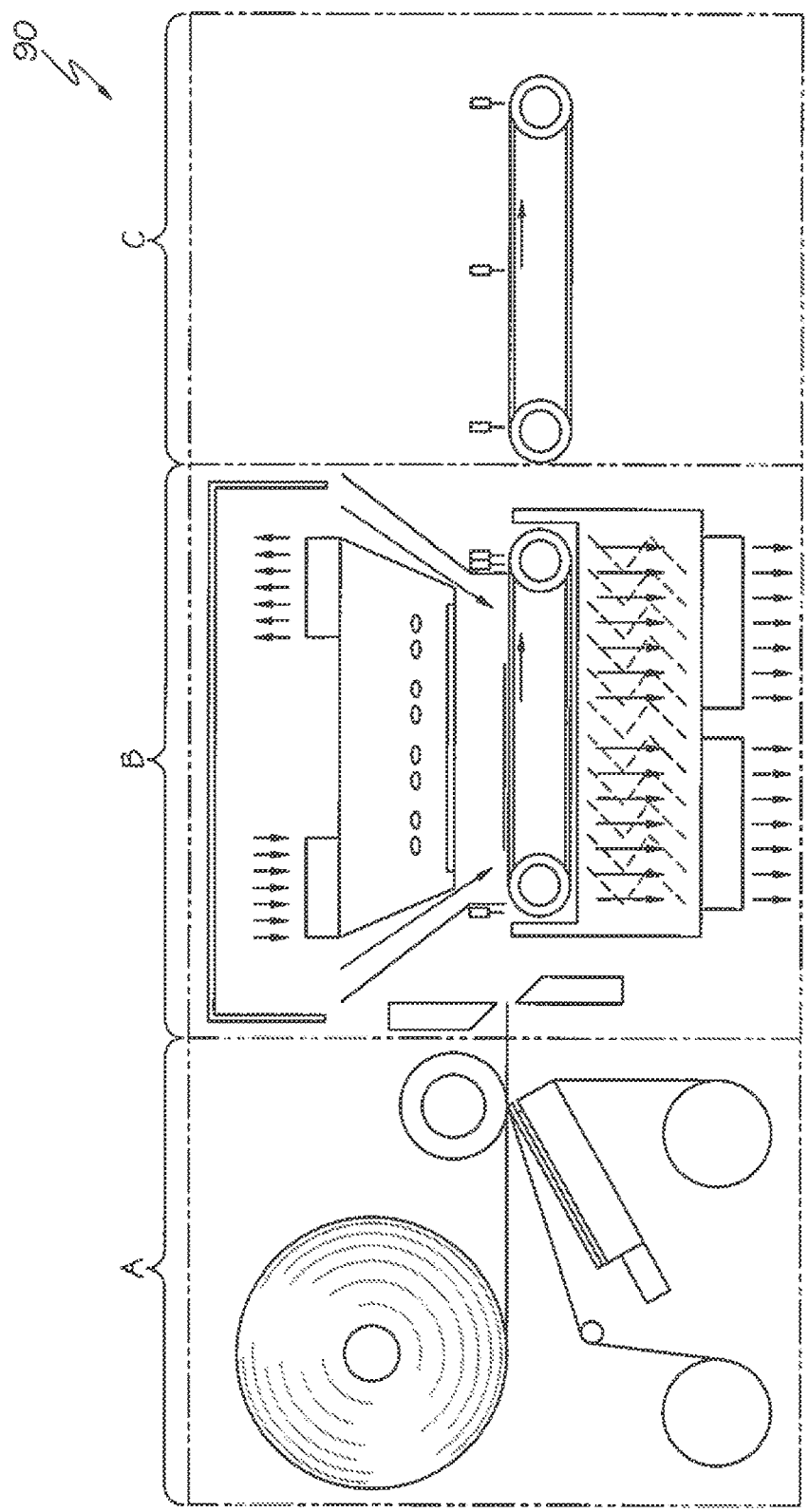

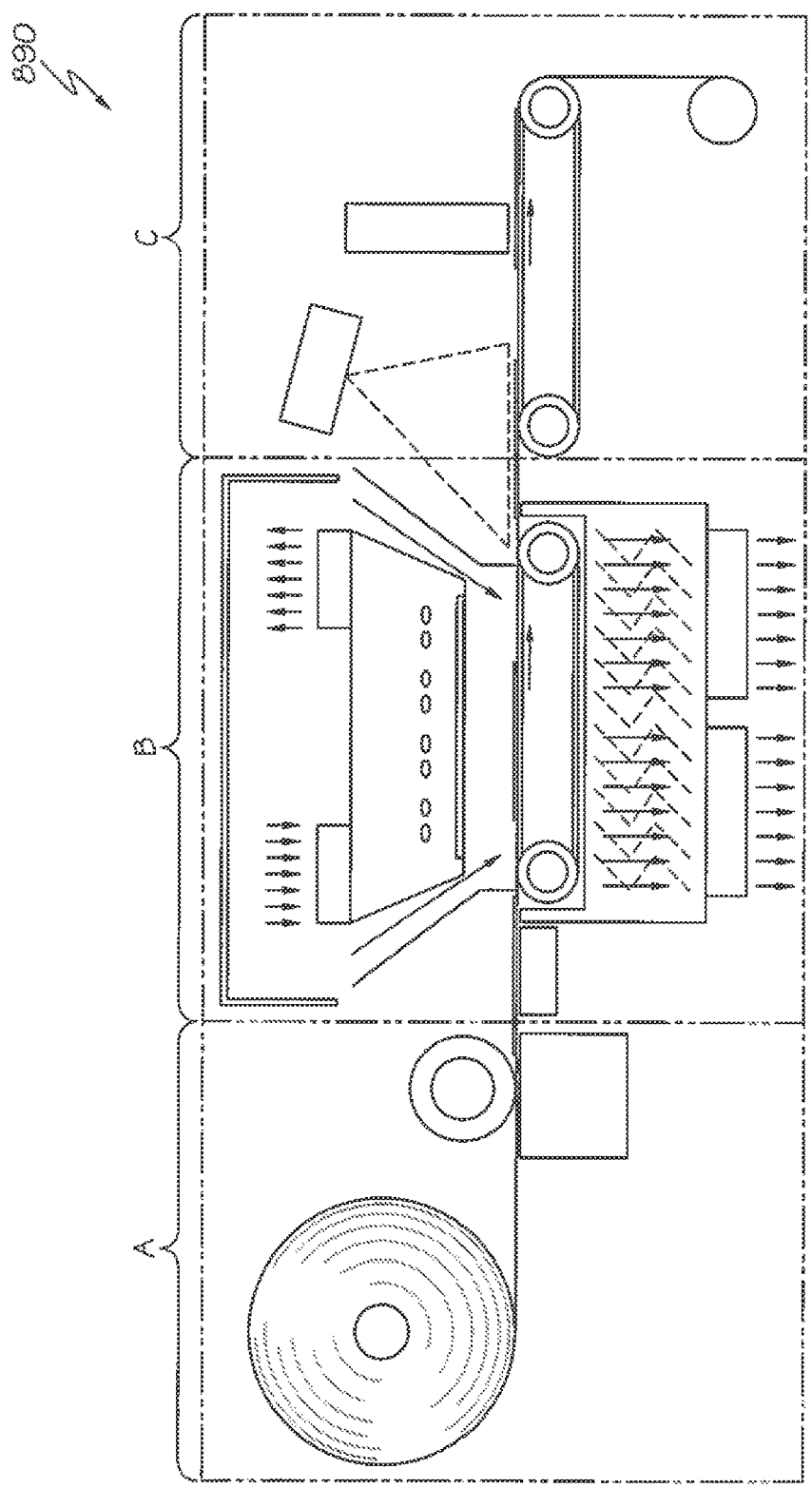

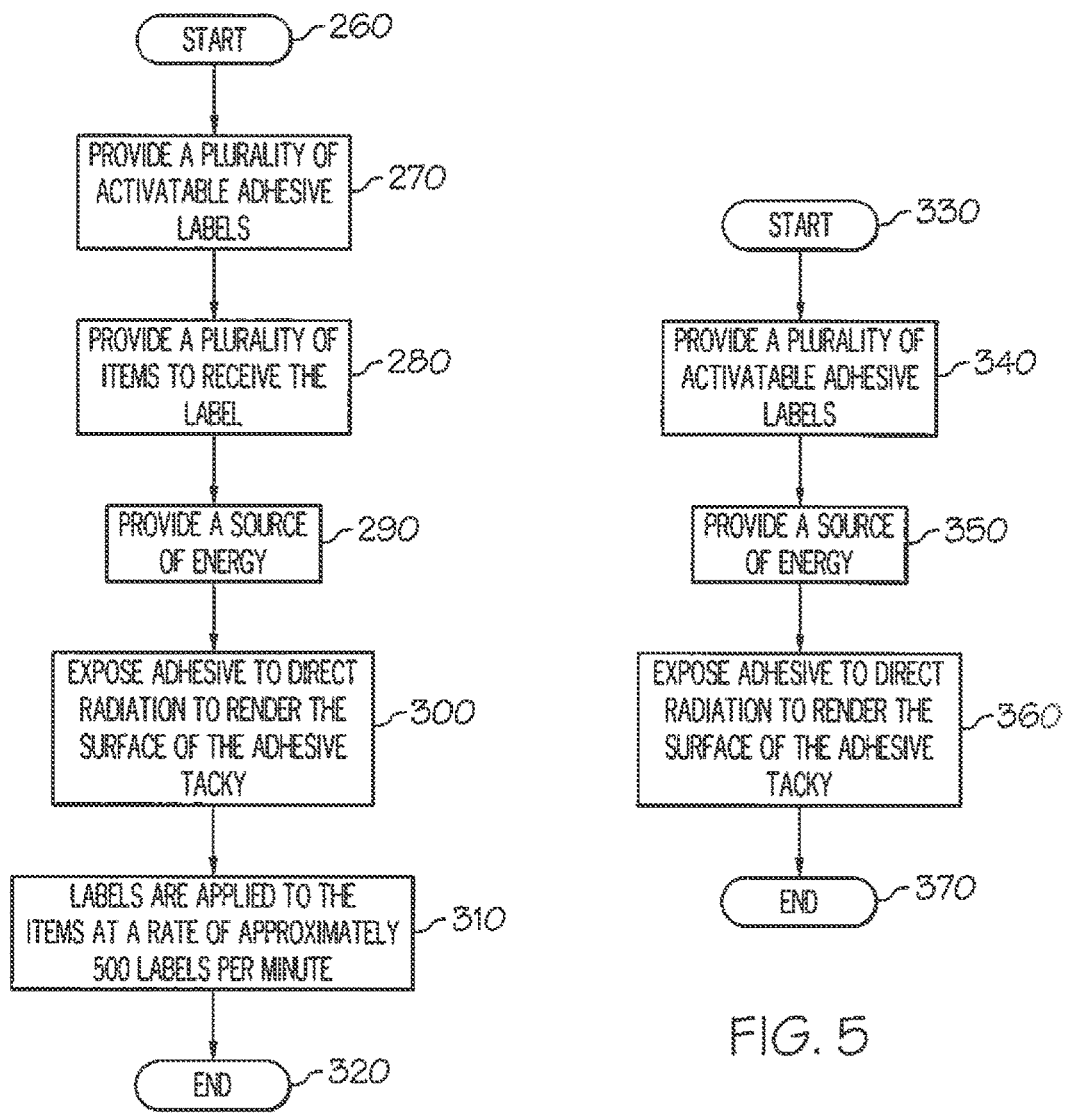

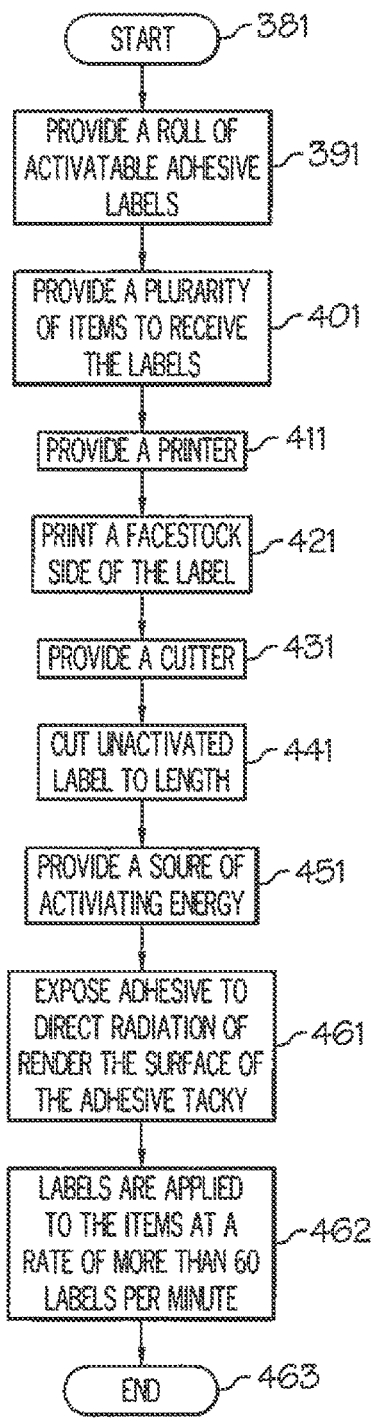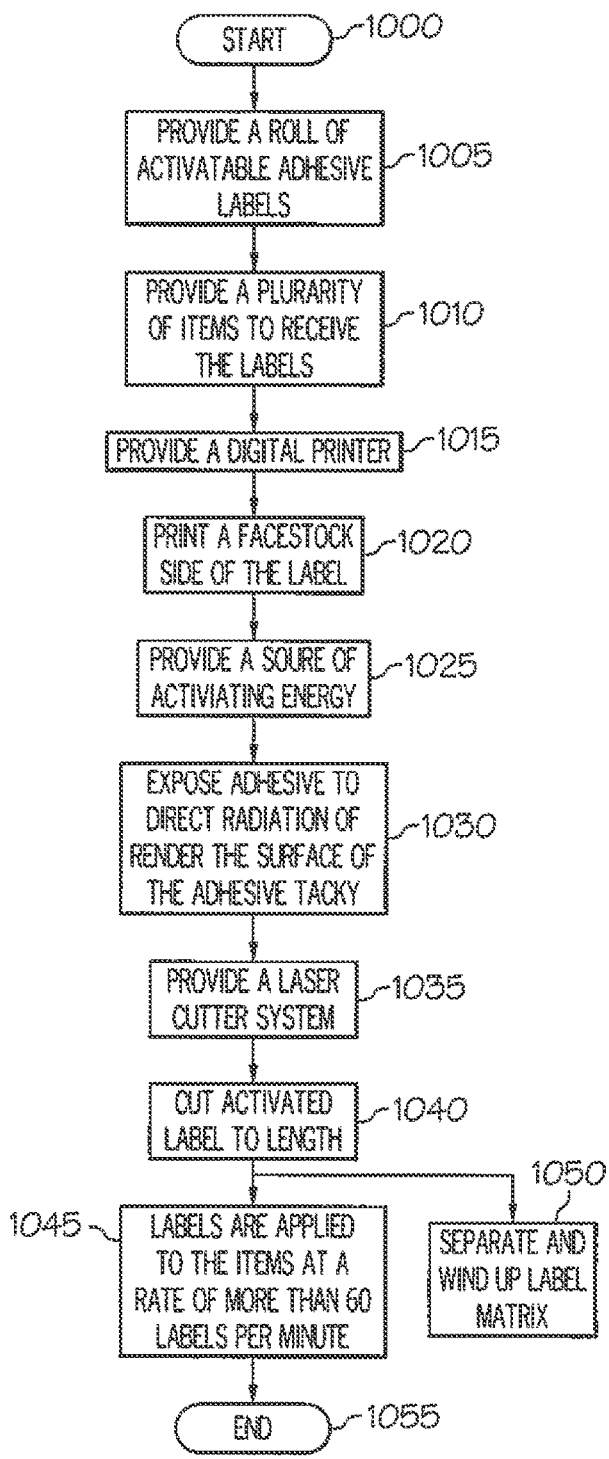
FIG. 6A
FIG. 6B

ACTIVATABLE ADHESIVE, LABELS, AND RELATED METHODS

CROSS-REFERENCE TO RELATED APPLICATIONS

The present application is a continuation of U.S. patent application Ser. No. 13/892,443 filed May 13, 2013, which is a division of U.S. patent application Ser. No. 13/119,006 filed Mar. 15, 2011, which is a 371 of International Patent Application No. PCT/US2010/047428 filed Sep. 1, 2010, which is a Continuation-In-Part of U.S. patent application Ser. No. 12/561,349 filed Sep. 17, 2009, and further claims the benefit of U.S. Provisional Patent Application No. 61/097,822 filed Sep. 17, 2008, all of which are incorporated herein by reference in their entireties.

FIELD OF THE INVENTION

The present invention generally relates to adhesives and labels. More specifically, the invention relates to activatable adhesives and activation of label adhesives using radiation and temperature changes.

BACKGROUND OF THE INVENTION

Traditional pressure sensitive labels are supplied to the user affixed to a release liner. These release liners are typically silicone coated, and, as such, are not usable as sources for recycled paper. In an effort to reduce cost, improve efficiencies, and reduce environmental impact, consumer demand for labels without liners has increased in recent years. The most common forms of these labels are "linerless labels" and "activatable labels".

"Linerless labels" have a sticky side and a release-coated side so they can be wound upon themselves into rolls. The use of these linerless labels requires either preprinting or special printers that are configured to print on release coating. The equipment used to manipulate linerless labels includes special rollers and platens that are configured to contact the sticky side of the labels. Despite many improvements in this equipment, adhesive buildup still occurs in various sections of the equipment. Because of these shortcomings, and also the high price of the final sticky "linerless" product, these linerless labels have not received wide customer acceptance.

"Activatable labels" are supplied to the end user in a non-tacky state, and then the labels are activated, i.e., the label's adhesive is activated, to a tacky state just prior to application to the intended object. Most often, activatable labels are printed with indicia prior to activation. Known activation schemes include the use of ultraviolet ("UV") energy to heat the adhesive (see U.S. Pat. No. 6,492,019 to Shipston et al.), corona treatment to activate the surface (see U.S. Pat. No. 6,326,450 to Shipston et al.), radiant heat to warm the adhesive (see U.S. Pat. No. 6,500,536 to Yamada et al.), moisture to activate a rewettable adhesive (see U.S. Pat. No. 6,803,100 to Hintz et al.), microencapsulating an activator material, which can then be crushed to allow the activator to mix with the rest of the formulation and activate the adhesive (see U.S. Pat. No. 7,026,047 to Krolzig), overcoating the adhesive with a detackifier layer, which is later removed by heat or mechanical means (see U.S. Pat. No. 5,569,515 to Rice et al.), and ultrasound energy to activate the adhesive (see U.S. Pat. No. 5,702,771 to Shipston et al.).

By far, the most common activation scheme utilizes heat activation, i.e., the activation of the label using heat. For heat activation, various techniques have been proposed. These include the use of the following: heated drums or rollers (see U.S. Pat. Nos. 5,749,990 and 5,480,502 to Rello et al.), direct contact with the heating element (see U.S. Pat. No. 6,388,692 to Iwata et al. and U.S. Pat. No. 6,501,495 to Ichikawa et al.), microwave energy (see U.S. Pat. No. 3,461,014 to James), heated belts in contact with the adhesive (see U.S. Pat. No. 4,468,274 to Adachi and U.S. Pat. No. 6,031,553 to Nagamoto et al.), and infrared ("IR") and near infrared radiation ("NIR") (see U.S. Pat. No. 3,247,041 to Henderson and U.S. Pat. No. 4,156,626 to Souder). In addition, general methods for heating using radio frequency ("RF") energy, inductive heat, radiant heat, and visible light also are well known and could be applied to this list of activation methods. These techniques have all proven useful at low-speed operations, but as application speeds increase, these methods all suffer in that the exposure times of the labels to the heating elements must somehow be increased in order to gain sufficient heating. Either the size or the cost of the units capable of supplying sufficient heating has thwarted high-speed applications.

One way to overcome the need for larger or longer heaters is to increase the ability of the adhesive to absorb the energy from the heating devices. U.S. Pat. No. 4,156,626 to Souder and U.S. Pat. No. 6,043,190 to Ichikawa et al., and U.S. Patent Application Publication Numbers 2003/0041963 and 2004/0166309 to Gong et al. all describe the use of NIR absorbers to increase the energy absorbance by adhesives. Hence, the use of NIR absorbers and high-intensity NIR lamps might appear to be a viable route for activating the adhesive. Although satisfactory in many respects, disadvantages exist involving currently known activatable labels, labeling systems, and related methods.

Hence, there remains a need for a label without a liner and a related method of high-speed activation of the label. The present invention satisfies these needs.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

An exemplary embodiment of the present invention is an aqueous adhesive composition which is activatable by exposure to IR radiation and which exhibits pressure sensitive adhesive properties once activated by IR or by heating. The adhesive composition comprises (i) an emulsion base copolymer exhibiting a glass transition temperature Tg above 25° C. and a weight average molecular weight within a range of from 15,000 Daltons to 100,000 Daltons, (ii) a solid plasticizer for such copolymer exhibiting a melting point above 40° C., and (iii) a high softening point tackifier.

Another exemplary embodiment is an adhesive that includes a plasticizer, a tackifier, and an adhesive base polymer that includes a lower alkyl acrylate such as butyl acrylate, styrene, methyl methacrylate, methacrylic acid, and acrylic acid.

Generally, the present invention provides an adhesive system that comprises from about 20% to about 35% of an adhesive base polymer, from about 50% to about 75% of a plasticizer, and from about 5% to about 20% of a tackifier.

Preferably, the adhesives comprise from about 24% to about 30% of an adhesive base polymer, from about 56% to about 68% of a plasticizer, and from about 8% to about 16% of a tackifier.

In a more detailed embodiment, particular formulations are provided for the adhesive systems. In one preferred composition, the adhesive comprises about 28.6% of an adhesive base polymer, about 57.1% of a plasticizer, and about 14.3% of a tackifier. In another preferred composition, the adhesive comprises about 25% of an adhesive base polymer, about 66% of a plasticizer, and about 9% of a tackifier.

Generally, in one embodiment, the invention provides an adhesive base polymer that includes from about 10% to about 50% of at least one lower alkyl acrylate, from about 20% to about 85% styrene, from about 1% to about 35% methyl methacrylate, from about 0.5% to about 5% methacrylic acid, from about 0.5% to about 5% acrylic acid, from about 0% to about 5.0% of at least one multifunctional monomer, and from about 0% to about 5.0% of at least one chain transfer agent.

In a more detailed aspect, the adhesive base polymer comprises from about 12% to about 48% of at least one lower alkyl acrylate, from about 23% to about 78% styrene, from about 3% to about 30% methyl methacrylate, from about 1% to about 2% methacrylic acid, from about 1% to about 3% acrylic acid, from about 0.5% to about 2.5% of at least one multifunctional monomer, and from about 1.0% to about 4.0% of at least one chain transfer agent.

In another detailed embodiment, particular formulations are provided for the adhesive base component. In one preferred composition for the adhesive base polymers, the butyl acrylate is about 37.2% of the adhesive base polymer, the styrene is about 29.3% of the adhesive base polymer, the methyl methacrylate is about 29.3% of the adhesive base polymer, the methacrylic acid is about 1.7% of the adhesive base polymer, and the acrylic acid is about 2.5% of the adhesive base polymer. In another embodiment, the butyl acrylate is about 48.0% of the adhesive base component, the styrene is about 23.9% of the adhesive base component, the methyl methacrylate is about 23.9% of the adhesive base component, the methacrylic acid is about 1.7% of the adhesive base component, and the acrylic acid is about 2.5% of the adhesive base component. In still another embodiment, the butyl acrylate is about 12.8% of the adhesive base component, the styrene is about 77.6% of the adhesive base component, the methyl methacrylate is about 3.2% of the adhesive base component, the methacrylic acid is about 1.2% of the adhesive base component, and the acrylic acid is about 1.7% of the adhesive base component, a multifunctional monomer amount is 1.5%, and a chain transfer agent amount is 1.9%.

In other more detailed features of the invention, the adhesive is white. Also, in other features, the adhesive does not include and so, is free from carbon black, graphite, an ink, a dye, a pigment, and/or a colorant. In addition, the plasticizer can be UNIPLEX 250 or dicyclohexyl phthalate. In addition, the tackifier can be TACOLYN 3400 or ARAKAWA SE-E 650.

In other more detailed features of the invention, the plasticizer is configured to melt upon and/or after exposure to energy. Also, the adhesive can be configured to be activated by exposure to energy for less than one second. In addition, the adhesive can be configured to be activated by exposure to energy for less than 0.3 second.

In other more detailed features of the invention, the energy is NIR, short IR energy, Mid Wave IR energy, IR energy, microwave energy, RF energy, inductive heat energy, visible light energy, radiant heat energy, or UV energy. Also, the IR energy can have a peak wavelength from approximately 0.8 micrometer to approximately 3.0 micrometers. In addition, the energy can have a peak wavelength from approximately 1.2 micrometers to approximately 2.5 micrometers.

In other more detailed features of the invention, the adhesive is activatable, the adhesive has a tackiness, and the adhesive's tackiness is maintained for at least approximately two minutes after the adhesive is activated.

Another exemplary embodiment is a label that includes a facestock layer and an adhesive layer that is coupled to the facestock layer. The adhesive layer includes a plasticizer, a tackifier, and an adhesive base polymer that includes butyl acrylate, styrene, methyl methacrylate, methacrylic acid, and acrylic acid.

In other more detailed features of the invention, the label is configured to be exposed to radiant energy, the radiant energy has a wavelength and an intensity that results in the adhesive layer becoming tacky after exposure to the radiant energy, and the facestock layer is not discolored after the exposure of the label to the radiant energy. Also, the facestock layer can be made of paper, polymer film, metallized paper, metallized film, paper backed foil, or metal foil.

In other more detailed features of the invention, the label is configured to be applied to an item, and to be repositioned for approximately one minute after the label is applied to the item. Also, the adhesive layer can be activatable, have a tackiness, and be configured to be applied to an item, so that after the label is applied to the item, the adhesive layer's tackiness prevents the label from inadvertently being removed from the item. In addition, the label can be configured to be applied to an item, and after the label is applied to the item, the label permanently bonds with the item after approximately two hours.

Another exemplary embodiment is a label assembly comprising a facestock layer and a heat activatable adhesive layer, and a functional coating layer disposed between the adhesive layer and the facestock layer.

Another exemplary embodiment is a label that includes a facestock layer, an adhesive layer, and a reflective layer that is coupled between the facestock layer and the adhesive layer.

Another exemplary embodiment is a label that includes a facestock layer, an adhesive layer, and a barrier layer disposed between the facestock layer and the adhesive layer.

And, another exemplary embodiment is a label that includes a facestock layer, an adhesive layer, and a primer layer disposed between the facestock layer and the adhesive layer.

In other more detailed features of the invention, the adhesive layer of the various label assemblies includes a plasticizer, a tackifier, and an adhesive base polymer including butyl acrylate, styrene, methyl methacrylate, methacrylic acid, and acrylic acid.

In other more detailed features of the invention, the label is configured to be exposed to a radiant energy, the radiant energy has a wavelength and an intensity that results in the adhesive layer becoming tacky after exposure to the radiant energy, and the facestock layer is not discolored after the exposure of the label to the radiant energy. Also, the facestock layer can have a bottom surface, and the label can include a reflective layer that is made of a material that is applied as a coating to the bottom surface of the facestock layer. In addition, the material of the reflective layer can be gold, silver, aluminum, or copper. Furthermore, the reflective layer can have a thickness of not greater than one micron.

In other more detailed features of the invention, the reflective layer has a reflectivity value, and the reflectivity value is greater than approximately 90 percent. Also, the reflective layer can underlie only a portion of the facestock layer. In addition, the adhesive layer can have a first surface, the reflective layer can have a second surface that is adjacent to the first surface, and the second surface can be textured. Furthermore, the second surface's texture can be configured to be retroreflective.

In other more detailed features of the invention, the label is configured to be exposed to a radiant energy, the radiant energy has a wavelength and an intensity that results in the adhesive layer becoming tacky after exposure to the radiant energy, and the facestock layer is not discolored after the exposure of the label to the radiant energy. Also, the facestock layer can have a bottom surface, and the label can include a barrier layer that is made of a material that is applied as a coating to the bottom surface of the facestock layer. In addition, the material of the barrier layer is selected so as to prevent or at least significantly reduce discoloration of the facestock layer.

Another exemplary embodiment is a system that is configured to facilitate the application of an activatable label to an item. The system includes an energy source that is configured to emit energy and one or more actuators that are configured to receive the activatable label, transport the activatable label through the emitted energy, and transport the activatable label to a position where the activatable label is applied to the item. The activatable label includes an adhesive having a plasticizer, a tackifier, and an adhesive base polymer that includes butyl acrylate, styrene, methyl methacrylate, methacrylic acid, and acrylic acid.

Another exemplary embodiment is a system that is configured to facilitate the application of an activatable label to an item. The system includes an energy source that is configured to emit energy, a printer that is configured to print indicia on the activatable label, and one or more actuators that are configured to receive the activatable label, transport the activatable label past the printer that then prints the indicia on the activatable label, transport the activatable label through the emitted energy, and transport the activatable label to a position where the activatable label is applied to the item. The activatable label includes an adhesive having a plasticizer, a tackifier, and an adhesive base polymer that includes butyl acrylate, styrene, methyl methacrylate, methacrylic acid, and acrylic acid.

In other more detailed features of the invention, the one or more actuators is a blower system, a conveyor belt, a paddle, a carrier sheet, a plunger, a vacuum drum, a roller, a vacuum belt, or a vacuum head. Also, the item to receive the label can be a bottle, a can, a container, a vessel, a bag, a pouch, an envelope, a parcel, or a box. In addition, the activatable label can be one of a stack of precut activatable labels.

An exemplary method according to the invention is a method for applying a label with an activatable adhesive to an item. The method includes providing a label that has a first surface that is coated with an activatable adhesive, the adhesive including a plasticizer, a tackifier, and an adhesive base polymer including butyl acrylate, styrene, methyl methacrylate, methacrylic acid, and acrylic acid. The method also includes providing the item that has a second surface, providing a source of energy that is configured to output radiant energy, exposing the first surface of the label to the radiant energy that is output from the source of energy so the first surface of the label becomes tacky, and placing the first surface of the label in contact with the second surface of the item.

In other more detailed features of the invention, the label is pre-printed with indicia. Also, the method can further include providing a printer that is configured to print an image on the label, and printing the image on the label before the step of exposing the label to the radiant energy. Also the method includes providing a cutter that is configured to cut the dry label to a desired length before the activation stage. In addition, the label can include a facestock layer and an adhesive layer. The adhesive layer includes the adhesive base polymer, the plasticizer, and the tackifier, and the facestock layer is not discolored after the exposure of the label to the radiant energy.

In other more detailed features of the invention, the step of providing the label includes providing a plurality of labels, the step of providing an item includes providing a plurality of items, the step of exposing the label includes exposing at least one of the plurality of the label to the radiant energy, and the step of placing the label in contact with the item includes placing one of the plurality of labels in contact with one of the plurality of items at a rate greater than approximately 60 labels per minute. Also, the step of placing the label in contact with the item includes placing one of the plurality of labels in contact with one of the plurality of items at a rate of less than or equal to approximately 1,000 labels per minute.

Another exemplary method according to the invention is a method for activating a label. The method includes providing a label having a first surface that is coated with an activatable adhesive, the activatable adhesive includes a plasticizer, a tackifier, and an adhesive base polymer including butyl acrylate, styrene, methyl methacrylate, methacrylic acid, and acrylic acid. The method also includes providing a source of energy that is configured to output radiant energy, and exposing the label to the radiant energy that is output from the source of energy so the first surface of the label becomes tacky.

In another exemplary embodiment, a system is provided for printing and applying labels to articles. The system comprises a printer unit, a thermal activation unit downstream of the printer unit, and an applicator unit downstream of the thermal activation unit. The thermal activation unit includes a label transport assembly and one or more emitters that are configured to emit radiation to labels. In particularly preferred aspects of this system, unique sensor arrangements are utilized to assess whether label degradation condition(s) are occurring. And, optional quartz glass members are preferably used to improve safety and operability of the system.

BRIEF DESCRIPTION OF THE DRAWINGS

These, as well as other features, aspects, and advantages of this invention, will be more completely understood and appreciated by referring to the following more detailed description of the exemplary embodiments of the invention in conjunction with the accompanying drawings.

FIG. 3A is a diagram of an exemplary system for performing a print and apply type of label application.

FIG. 3B is a diagram of another preferred system for applying a label with an activatable adhesive to an item.

FIG. 3D is a diagram of another preferred system for applying a label with an activatable adhesive to an item.

FIG. 4 is a flowchart of an exemplary method for applying a label with an activatable adhesive to an item.

FIG. 5 is a flowchart of an exemplary method for activating a label according to the invention.

FIG. 6A is a flowchart of an exemplary method for applying a label according to the invention.

FIG. 6B is a flowchart of another exemplary method for applying a label according to the invention.

Figure 1:
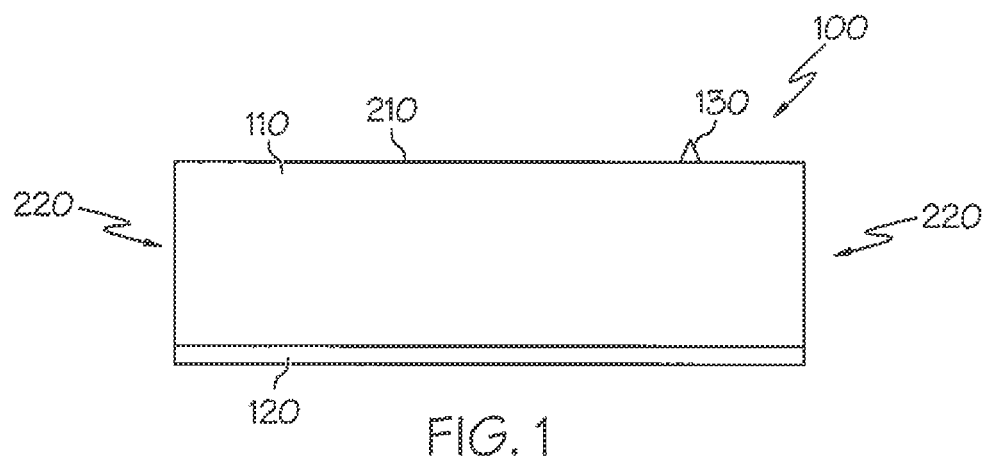
FIG. 1 is a sectional view of a preferred embodiment activatable label in accordance with the invention.

Unless otherwise indicated, the illustrations in the above figures are not necessarily drawn to scale.

DETAILED DESCRIPTION OF THE EMBODIMENTS

The present invention is now illustrated in greater detail by way of the following detailed description, which represents the best presently known mode of carrying out the invention. However, it should be understood that this description is not to be used to limit the present invention, but rather, is provided for the purpose of illustrating the general features of the invention.

As previously noted, the use of energy absorbers in an adhesive formulation is well documented, but in certain instances, can result in darkly colored adhesives that are not compatible with the aesthetic requirements of today's consumer market. As a result, investigations were conducted to identify other absorbers that possessed little or no color. By using common adsorption spectroscopy including UV and IR spectral analysis, a comparison of the absorption spectra of various adhesive components with the emission spectra of various commercial energy sources was obtained. By matching the absorbance range of the adhesive with the emission range of the radiation or energy source, one can achieve maximum energy transfer or substantially so, from the radiation source to the adhesive. The radiation source can emit a broad spectrum of energy wavelengths, typically with a peak wavelength, i.e. the wavelength associated with the peak energy value in the spectrum. As a result, it was possible to create adhesives that demonstrated high absorption properties. These absorption properties allow for the heat activation of the adhesives at faster rates while requiring less energy to power the radiation sources and without the drawback of having a darkly colored adhesive. Likewise, by tuning the adhesive absorption to approximately match the radiation emission, most of the energy that is radiated upon the label is absorbed by the adhesive, leaving little energy remaining to couple with the facestock or the indicia printed upon the facestock. If energy is allowed to be absorbed by the facestock or the indicia, the resulting heating of the facestock or the indicia can cause discoloration of the facestock. While tuning the adhesive's absorption to the radiation source lowers the occurrence of this form of facestock discoloration, it has been discovered that, in some cases, additional measures to avoid discoloration of the facestock are warranted. In these cases, the discoloration can be avoided by use of a functional layer such as a reflective layer and/or a barrier layer between the adhesive and the facestock. It is also contemplated that the functional layer could be in the form of a primer layer.

It will be appreciated that although various preferred embodiments of the invention are directed to providing adhesives that are transparent, translucent, or white in appearance; the invention is also applicable in providing adhesives that are opaque or dark in appearance. Thus, for many applications in which the former type of adhesives find use, such adhesives are preferably free of additives, pigments, dyes, inks, and/or colorants such as for example, carbon black or graphite. And for the latter type of adhesives, such adhesives may contain one or more additives, pigments, dyes, inks, and/or colorants such as for example carbon black or graphite.

Another important attribute of the activatable adhesive is the ability of the adhesive to stay in an activated state, i.e., the adhesive is in a tacky state, long enough to allow application of the label to an item before the adhesive loses its tackiness. This time period is commonly referred to as the "open time" of the adhesive. Depending on the speed of application of the label to the item, and the distance between the activating device and the point where the label is applied to the item, this open time could be a fraction of a second and as long as several minutes or more. Embodiments of the adhesive can be repositionable for approximately 60 seconds, e.g., one minute, after application of the label to the item so that minor adjustments can be made to the label's position on the item immediately after application. Embodiments of the adhesive form a permanent bond between the label and the item within approximately two minutes, after activation of the label, so that the label can not inadvertently be removed from, or repositioned on, the item.

Adhesives

Generally, in accordance with the present invention, various activatable adhesives or adhesive systems are provided as described in greater detail herein. However, it will be appreciated that in no way is the invention limited to the use of the particular adhesive systems described herein. Preferably, the adhesive systems utilize the particular adhesive base polymers described herein. The adhesive systems generally comprise (i) an adhesive base polymer, (ii) a plasticizer, and (iii) a tackifier. Typical and preferred weight percent concentrations for each of these components are set forth below in Table 1. It will be appreciated that the noted weight percent concentrations are based upon the total weight of components (i)-(iii). Thus, it is contemplated and expected that the adhesive systems may include additional components and additives in addition to components (i)-(iii) listed below in Table 1.

TABLE 1

Typical and Preferred Concentrations of Components in Preferred Adhesive Systems

| Component | Typical Concentration | Preferred Concentration |
|---|---|---|
| Adhesive Polymer Base | 20%-35% | 24%-30% |
| Plasticizer | 50%-75% | 56%-68% |
| Tackifier | 5%-20% | 8%-16% |

The preferred adhesive systems described herein generally comprise an adhesive base polymer (described in greater detail herein), a plasticizer which preferably, is in a solid crystalline state below the application temperature, and a solid tackifier which preferably, is also in a solid state below the application temperature. The physical states of the adhesive material can be switched between solid and non-solid by altering the temperature. The open time of the adhesive can be controlled by adjusting the ratio of the components, i.e. the adhesive polymer base, the plasticizer, and the tackifier. The preferred activation temperature is preferably within the range of from about 50° C. to about 120° C. However, it will be understood that the invention is not limited to adhesive systems exhibiting activation temperatures within this range.

At the switching temperature of the adhesive, the properties of adhesion and viscosity markedly change. Therefore, a pressure sensitive adhesive system can be thermally switched from "off" to "on" by using these strategies described herein. If such adhesive system is then coated on a facestock at a temperature below the designed switch temperature, the material is in its non-sticky solid state. Thus, the label construction can be wound in a roll form. During the application process, the temperature is increased to the switching temperature so that the material will change to a non-solid state and then exhibit its pressure sensitive adhesive properties, which allow the label to be adhered to a substrate as desired as a result of increased adhesion properties. If the substrate exhibits a porous surface, the preferred embodiment adhesive systems will flow into the pores and "stick" very well, as a result of the interlocking effect even when the temperature is reduced below that of the switching temperature of the adhesive.

The formulation shown in Table 2, illustrates one exemplary adhesive formulation wherein dicyclohexyl phthalate is used both as a plasticizer and as an energy absorption agent. Another example of a preferred plasticizer is glyceryl tribenzoate. Additional examples of preferred plasticizers include diphenyl phthalate and 1,4-cyclohexane dimethanol dibenzoate.

TABLE 2

Exemplary Adhesive Formulation

| | Weight % Concentration |
|---|---|
| Adhesive Polymer Base | |
| Butyl Acrylate ("BA") | 37.2% |
| Styrene | 29.3% |
| Methyl Methacrylate ("MMA") | 29.3% |
| Methacrylic Acid ("MAA") | 1.7% |
| Acrylic Acid ("AA") | 2.5% |
| Heat-Activatable Adhesive: | |
| Adhesive Polymer Base | 28.6% |
| Dicylclohexyl Phthlate (Plasticizer) | 57.1% |
| TACOLYN 3400 (Tackifier) | 14.3% |

As explained in greater detail herein, in forming the adhesive polymer base it is preferred to utilize effective amounts of one or more multifunctional monomers and one or more chain transfer agents. A representative preferred multifunctional monomer is ethylene glycol dimethacrylate (EGDMA). A preferred chain transfer agent is n-dodecyl mercaptan (n-DDM).

The present invention also provides various preferred embodiment adhesive polymer bases comprising (i) one or more lower alkyl acrylates, (ii) styrene, (iii) methyl methacrylate (MMA), (iv) methacrylic acid (MAA), (v) acrylic acid (AA), one or more multifunctional monomers, and one or more chain transfer agents. In one embodiment, typical and preferred concentrations for each of these components are set forth below in Table 3 as follows. The weight percent concentrations listed in Table 3 are based upon the total weight of the adhesive polymer base. It will be understood that the various adhesive base polymers described herein are merely representative in nature. Although generally constituting preferred embodiments of the invention, in no way is the invention limited to the use of the particular adhesive base polymers described herein.

TABLE 3

Typical and Preferred Concentrations of Components in Adhesive Polymer Bases

| Component | Typical Concentration | Preferred Concentration |
|---|---|---|
| Lower Alkyl Acrylate | 5%-50% | 12%-48% |
| Styrene | 20%-85% | 23%-78% |
| MMA | 1%-35% | 3%-30% |

TABLE 3-continued

Typical and Preferred Concentrations of
Components in Adhesive Polymer Bases

| Component | Typical Concentration | Preferred Concentration |
|---|---|---|
| MAA | 0.5%-5% | 1%-2% |
| AA | 0.5%-5% | 1%-3% |
| Multifunctional Monomer | 0%-5% | 0.5%-2.5% |
| Chain Transfer Agent | 0%-5% | 1.0%-4.0% |

A wide array of lower alkyl acrylates can be used singly or in combination for component (i) in the preferred embodiment adhesive polymer base. For example, methyl acrylate, butyl acrylate, ethyl acrylate, and 2-ethylhexyl acrylate could be used. However, butylate acrylate and ethyl acrylate are generally preferred with butyl acrylate being most preferred.

A wide array of styrene and styrene based materials can be used for component (ii).

Similarly, for component (iii), it is generally preferred that methyl methacrylate (MMA) be used. However, it will be appreciated that other analogues and functionally equivalent monomers could be used in conjunction with or instead of MMA.

The preferred monomer for component (iv) is methacrylic acid (MAA). However, it will be appreciated that the invention includes the use of other equivalent monomers in conjunction with or instead of MAA.

And, although acrylic acid (AA) is noted for use as component (v), it will be understood that the invention includes the use of other equivalent monomers.

A wide array of multifunctional monomers or multifunctional monomer agents can be used in the present invention. The multifunctional monomers can be used to achieve cross-linking of the base polymer. Representative examples of such multifunctional monomers include, but are not limited to, difunctional monomers, trifunctional monomers, and multifunctional monomers having more than three active functional sites. Preferred examples of difunctional monomers include, but are not limited to 1,4 butanediol diacrylate, polyethylene glycol (200) diacrylate, and combinations thereof. Another preferred difunctional monomer is ethylene glycol dimethacrylate (EGDMA). Preferred examples of trifunctional monomers include, but are not limited to ethoxylated (15) trimethylolpropane triacrylate, propoxylated (3) glycerol triacrylate, and combinations thereof. Preferred examples of multifunctional monomers having more than three active functional sites include, but are not limited to, ethoxylated pentaerythritol tetraacrylate, dipentaerythritol, pentaacrylates, and combinations thereof. These and numerous other suitable multifunctional monomers are commercially available from various suppliers such as Sartomer of Exton, Pa. Typical concentrations of multifunctional monomers range from about 0 to about 5.0%, with from about 0.5% to about 2.5% being preferred, and from about 1.5% to about 2.0% being most preferred.

Chain transfer agents when used in forming the adhesives, are typically used at concentrations of from about 0 to about 5.0%, and preferably from about 1.0% to about 4.0% (percentages are based upon the total weight of monomers). Representative examples of suitable chain transfer agents include, but are not limited to n-dodecyl mercaptan (n-DDM), tert-nonyl mercaptan, isooctyl 3-mercaptopropionate, and combinations thereof. It will be understood that in no way is the invention limited to these chain transfer agents. Instead, a wide array of chain transfer agents can be used. Suitable chain transfer agents are available commercially such as from Sigma Aldrich of St. Louis, Mo. Most preferably, the adhesive polymer bases include both (i) one or more multifunctional monomer agents and (ii) one or more chain transfer agents.

In one embodiment, a particularly preferred adhesive polymer base composition is set forth below in Table 3A.

TABLE 3A

Preferred and Most Preferred Concentrations of
Components in an Adhesive Polymer Base

| Component | Preferred Concentration | Most Preferred Concentration |
|---|---|---|
| Butyl Acrylate | 9%-14% | 12.8% |
| Styrene | 68%-80% | 77.6% |
| MMA | 2%-6% | 3.2% |
| MAA | 1%-2% | 1.2% |
| AA | 1%-2% | 1.7% |
| EGDMA | 0.5%-2.5% | 1.5% |
| n-DDM | 1.0%-4.0% | 1.9% |

The present invention provides a wide array of adhesives having unique characteristics that enable the adhesives to be used in numerous applications. One feature of the adhesives relates to the relatively short time period required for activating the adhesive, i.e. selectively changing the adhesive from a non-tacky state to a tacky state. Fast activation times enable the adhesive to be used in high speed labeling operations. Preferably, the adhesives of the present invention can be activated within a time period of about 0.3 seconds and generally activated in a time period of less than 1 second, and more typically, less than 0.5 seconds. This time period is referred to herein as the adhesive's "activation time."

As previously described herein, the adhesives, once activated, remain in their activated state long enough to at least allow application of a label carrying the adhesive to an item or receiving substrate before the adhesive loses its tackiness. This characteristic is described herein as the "open time" of the adhesive. The adhesives of the invention preferably exhibit an open time of at least from about 0.1 second to 10 minutes or longer. For certain applications, the adhesives can be tailored to exhibit relatively long open times, such as up to 72 hours or longer. Typically, the adhesives of the invention exhibit open times of from 10 seconds to 60 seconds.

Once the adhesives of the invention are activated, i.e. while in their "open" and tacky state, the adhesives exhibit relatively high tackiness. For example, the adhesives exhibit an initial peak tack to a substrate such as cardboard or steel of at least about 1.0 Newton, and preferably at least about 1.25 Newtons. As described in conjunction with the examples presented herein, typically, the preferred embodiment adhesives exhibit initial peak tack values in the range of from 1.0 Newton to 2.0 Newtons. These tack values are measured using SPAT, which is described in detail herein. Preferably, these tack values are with regard to the substrates as described herein. However, it will be appreciated that the present invention is not limited to adhesives that exhibit these tack values in association with the substrates described herein. That is, it is contemplated that the invention includes adhesives exhibiting these tack values in association with other substrates and substrate materials not expressly described herein. Furthermore, it is generally preferred that upon activation of the adhesive, the tackifier softens and is in a flowable state.

In addition, in certain embodiments, the adhesives of the present invention are generally clear after activation to allow the passage of light without any detrimental absorbance. Preferably the adhesives, once activated, remain in a clear or at least substantially clear state for relatively long time periods and preferably for at least 1 year, and more preferably longer than 1 year. It will also be understood that in other embodiments of the invention, the adhesives may contain one or more pigments, dyes, inks, colorants or the like such as for example, carbon black or graphite. In the event that the adhesive contains carbon black or graphite, typical concentrations range from about 0.01% to about 0.1% and preferably from about 0.02% to about 0.08%, based on wet weight. In certain applications, a concentration of about 0.05% of carbon block is used. A wide array of commercially available sources of carbon black may be used. Preferably, carbon black from Cabot Corporation of Boston, Mass. is utilized. Another preferred carbon black is available under the designation AURASPERSE W-7012, available from BASF Corporation of Florham Park, N.J.

The present invention adhesives, e.g. those for linerless label applications, can be solvent based, water based such as emulsion adhesives, hot melt, or UV curable adhesives, in which an adhesive base polymer is blended with other adhesive components such as a solid plasticizer, and/or a solid tackifier to yield a linerless adhesive that is heat activatable, and particularly, a light activatable adhesive such as NIR activatable adhesive formulation.

Additional aspects of the preferred embodiment adhesives are as follows. A typical range of average molecular weight of the adhesive base polymer is from about 10,000 Daltons to about 150,000 Daltons. A preferred range is from about 15,000 Daltons to about 100,000 Daltons, with a range of from about 20,000 Daltons to about 40,000 Daltons being most preferred. A lower molecular weight base polymer is generally preferred because such polymer can be activated faster than a corresponding base polymer having a higher molecular weight.

The adhesive base polymers also exhibit certain glass transition temperatures, Tg. Although the Tg of the base polymer depends upon pressure and temperature requirements of the process, and pressure and temperature conditions which the product may encounter, a typical Tg range is from about 20° C. to about 100° C. A preferred Tg range is from about 55° C. to about 80° C. And, a most preferred range for the glass transition temperature Tg of the base polymer is from 60° C. to 75° C.

It is also preferred that when forming the adhesives, after melting, the plasticizer remains in a liquid or flowable form for an extended period of time. The temperatures at which the plasticizers exist in a liquid or flowable state are typically from 50° C. to 120° C.

As a result of the particular formulation and selection of components, many of which have particular properties and characteristics, the preferred embodiment adhesives remain tacky in a temperature range of from about −10° C. to about 50° C. and preferably from ambient temperature to about 45° C. The preferred adhesives typically remain tacky for time periods of from about 0.1 seconds to about 2 weeks. However, it will be appreciated that the invention is not limited to these particular time periods. For example, adhesives can be formulated which remain tacky for periods longer than 2 weeks. Many of the preferred adhesives exhibit remarkably long open times, i.e. the period of time during which the adhesive is in a tacky state.

In accordance with the present invention, it is found that, by controlling various factors including the molecular weight and molecular weight distribution of the base polymer, as well as the level of the multifunctional monomer of the base polymer by using a combination of multifunctional monomer and chain transfer material, a heat switchable adhesive that has superior properties of fast activation, high tack, long open time, and long lasting clarity is obtained. Upon heating, the activatable adhesive behaves as a typical pressure sensitive adhesive, and the property of tack can be maintained for a prolonged period of time, which allows the adhesive material to flow or wet-out on the targeted substrate surface for enhancing the adhesion. Furthermore, the adhesive materials in this invention are inherently activatable with Near IR radiation, which leads to a short activation time for fast line speed.

The base polymers of the preferred adhesives of the invention typically exhibit a polydispersity index of from about 2.0 to about 10.0, and preferably from 2.0 to 4.0. However, it will be appreciated that the base polymers of the adhesives of the invention include polymeric systems exhibiting polydispersities less than 2.0 and greater than 10.0.

Labels, Additional Layers, Methods for Applying, and Equipment

FIG. 1 shows an exemplary activatable label construction 100 where a 10 mil facestock 110 (for example, the paper facestock used is APPLETON C1S LITHO 60 lb, by Appleton of Appleton, Wis.) is coated with a 1 mil layer of adhesive 120, the formulation of which is described in Table 2. The preparation of such label constructions is detailed, for example, in U.S. Pat. No. 4,745,026 to Tsukahara et al.

These labels 100 are typically printed with indicia 130 prior to activation. Indicia can include, for example, alphanumeric data/information and/or graphical images. Printing techniques are commonly known and include letterpress, laser, offset, gravure, flexographic, silk screen, and digital methods. Digital printing techniques can include, for example, ink jet, Xerographic, thermal, and electrographic techniques. To activate and apply the labels to an item, the labels are typically placed on a delivery device or actuator. These delivery devices include blower systems (see U.S. Pat. No. 4,784,714 to Shibata), conveyor belts (see U.S. Pat. No. 5,895,552 to Matsuguchi), paddles (see U.S. Pat. No. 5,922,169 to Chodacki), plungers (see U.S. Pat. No. 6,006, 808 to Ewert et al.), carrier sheets (see U.S. Pat. No. 7,029,549 to Von Folkenhausen et al.), vacuum drums (see U.S. Pat. No. 6,899,155 to Francke et al.), rollers (see U.S. Pat. No. 5,964,975 to Hinton), and vacuum heads or belts (see U.S. Pat. No. 6,471,802 to Williamson). The items to which a label can be applied can include, for example, boxes, parcels, envelopes, pouches, bags, vessels, containers, cans, and bottles.

The delivery device or actuator receives the label 100, then transports the label such that the adhesive 120 side of the label is exposed to an activation device, which employs an activation scheme as previously noted. In an example embodiment, the activation scheme can include the exposure of the label to IR energy having a peak wavelength from approximately 0.8 micrometers to approximately 3 micrometers. Multiple delivery devices can be used in sequence to transport the label from its unactivated state to attachment to an item. For example, the delivery devices can include one or more actuators that are configured to receive the label, transport the label through the radiant energy, and transport the label to a position where the label is applied to the item. Examples of the one or more actuators include a blower system, a conveyor belt, a paddle, a carrier sheet, a plunger, a vacuum drum, a roller, a vacuum belt, and a vacuum head.

In an embodiment, labels 100 are activated using a ten-inch long NIR unit by Advance Photonics Technology AG of Bruckmuhl, Germany with emitters that each are configured to emit from approximately 200 kW/m² to 800 kW/m² irradiance delivering up to 4000 kW/m² mostly around the peak wavelength of 0.8 micrometer. The same activation rates in excess of 200 labels/minute were also obtained using a Mid Wave IR ("MWIR") unit (Model M110) by Heraeus Noblelight GmbH of Keinostheim, Germany that include two twin tube carbon emitters (Model #45134293) with short response times of 1-2 second. Short response times are advantageous because the unit(s), i.e., the energy source(s) that are part of the activation device(s), can be turned ON and OFF at a fast rate, for example, a rate of once every second or two seconds. Energy savings result from avoiding the need to leave the unit(s) ON continuously. Because of the high energy density provided by the unit(s), the unit(s) need only be turned ON for a limited period of time to activate the adhesive 120. Depending on the dimensions of each label, exposure times of the adhesive to the radiation can be for less than one second, and typically range from approximately 0.1 second to approximately 0.5 second. The same high activation rates in excess of 200 labels/min were also obtained also using another type of Mid Wave IR referred to as twin tube Fast Mid Wave by Heraeus Noblelight GmbH radiating at slightly shorter wavelengths with a peak at 1.5 um. The response time is around 1 second for these emitters. They are narrower than carbon types giving higher energy densities. The selection of the type of emitter depends upon a variety of factors, and particularly is a trade off between high energy densities, e.g. highest absorption by the adhesive and lowest absorption by the printed indicia, or controlled penetration into the structure and fastest ON/OFF cycles. Other factors especially relating to safety of using these high power lamps in industrial applications need to be taken into account when designing the activation system.

Figure 2:
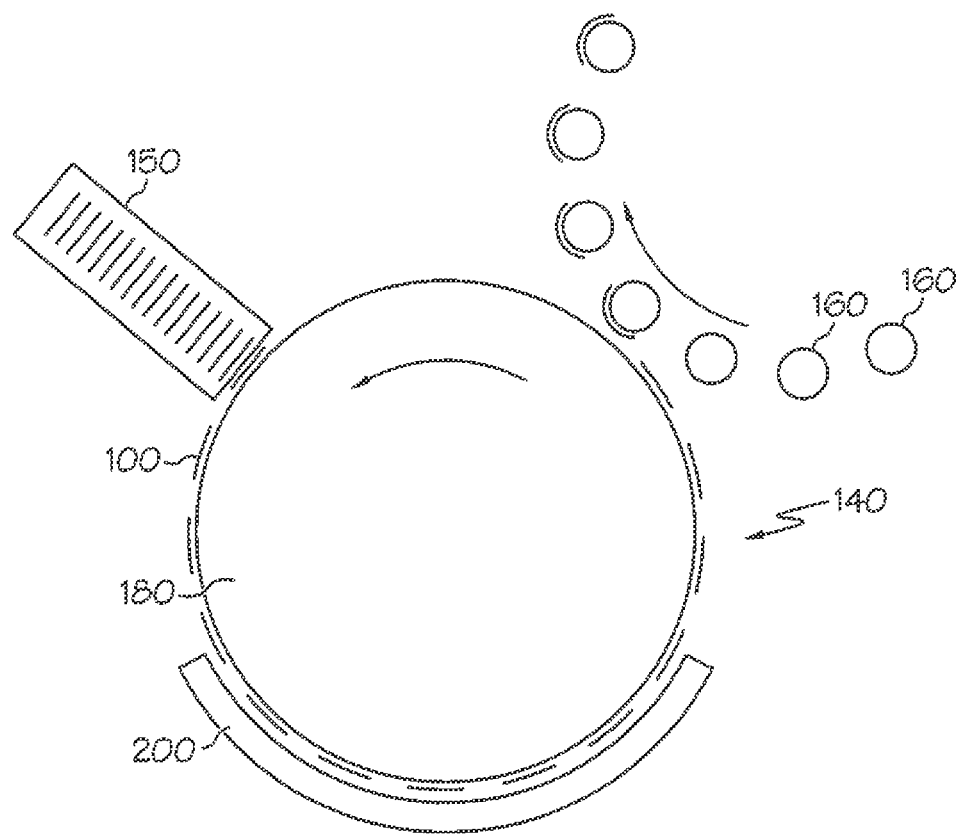
FIG. 2 is a diagram of an exemplary system in accordance with the invention for printing, cutting, activating and applying one or more labels to a container.

FIG. 2 shows an exemplary embodiment of a system 140 for a Cut and Stack type of label application, where a stack of precut activatable labels 150 are activated and affixed to items, e.g., containers 160. Each of the labels 100 are picked up by a vacuum drum 180 such that the label's adhesive layer 120 is not in contact with the vacuum drum, and the vacuum drum transports the labels past a NIR or MWIR source 200, which activates the labels, in particular, the labels' adhesive. The activated labels are then transported to the items where they are affixed to the items. Referring additionally to FIG. 1, in one embodiment, the labels are preprinted with indicia on the face 210 of the label.

One advantage of such a system 140 is that the system uses pre-coated and dried adhesive 120, which covers the edges 220 of the label 100 as evenly as other areas on the labels. Current Cut and Stack technology, which is generally known in the art, uses wet applied glue, which is not always well applied near the edge of a label. The poor alignment of the glue with the edge of the label can result in curling of label's edges where the adhesive coverage is not constant. This curling of the label's edges and the resulting lifting of the edges is referred to as "flagging". This often results in a label that, after application to an item, does not adhere to the item near the label's edge, and thus, the label is subject to tearing during transport and use.

Another advantage of such a system 140 is that the system allows for short changeover times. Current Cut and Stack technology requires special glue application feet that must match the size of the label 100, and must be adjusted to properly register with the label area and not cause edge bleeding of the adhesive 120. A typical change over time for such a process is up to eight hours. There is no need for special application feet and registration with the current invention. In example embodiments of the present invention, the change over time can range from, for example, approximately one hour to approximately two hours. Accordingly, change over time is greatly reduced as a result of the present invention.

Figure 3:
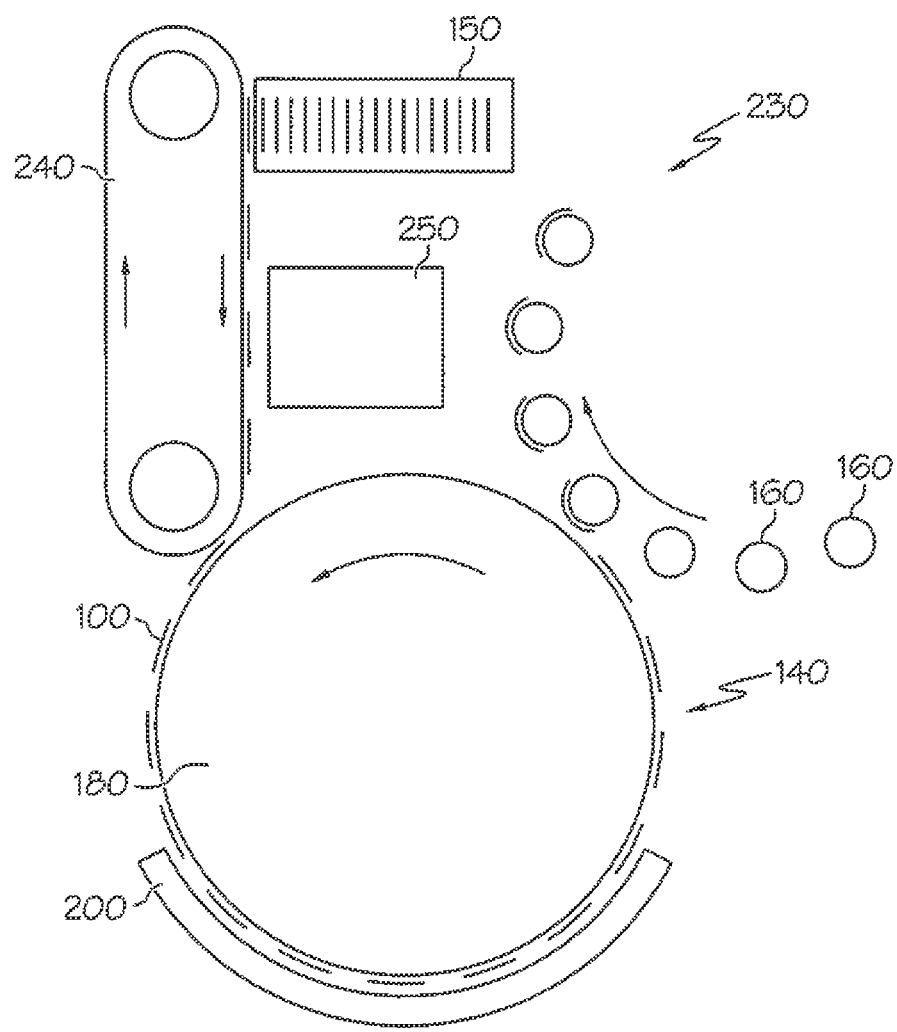
FIG. 3 is a diagram of an exemplary system for printing and activating a stack of labels and applying them to a container.

FIG. 3 shows an exemplary embodiment of a system 230 where a stack of precut activatable labels 150 are activated and affixed to items, e.g., containers 160. Each of the labels 100 are picked up by an actuator, for example, a conveyor belt 240, such that the adhesive layer 120 is in contact with the conveyor belt, and each of the labels is transported past a printer 250, which prints indicia 130 onto the face of the label. In example embodiments, the printer is configured to print images digitally, for example, using a thermal or other type of printer. The conveyor belt then transfers the label to another actuator, for example, a vacuum drum 180, such that the adhesive layer is not in contact with the drum, and the drum transports the labels past a NIR source 200, which activates the labels, in particular, the labels' adhesive. The activated labels are then transported to the items where they are affixed to the items.

FIG. 3A shows an exemplary embodiment of a system 141 for a Print and Apply (P&A) type of label applicators, where a continuous roll of labels 151 is provided to the Print and Apply machine. The web of labels is moved on a line 152 to a printer 251 where each label is printed by indicia 130 before it is cut by a cutter 252. The printed and cut labels are then transferred in the activation area using a conveyor, a vacuum belt 101 or similar component, past a NIR Short Wave IR (SWIR) or MWIR source 201 which activates each label in a fraction of a second. The activated label is then transported to the product 161 to which they are affixed. A belt applicator 181 can be used for transporting and/or applying labels.

Test results show that the spectra of IR from both NIR and MWIR radiations are highly effective at coupling with the dicyclohexyl phthalate based adhesive 120; other forms of heating such as microwave, laser, inductive heating, forced air, IR, visible light energy, radiant heat energy, and UV, are also useful when used in combination with appropriately matched additives that absorb in the appropriate frequency ranges. In an example embodiment, the energy that is used to activate the adhesive has a peak wavelength from approximately 0.8 micrometer to approximately 3.0 micrometers. In another example embodiment, the energy has a peak wavelength from approximately 1.25 micrometer to approximately 2.5 micrometers. The energy that is used to activate the adhesive can be output from a lamp(s) 200. In one example embodiment, the lamp(s) output energy wavelengths from approximately 0.8 micrometer to approximately 5 micrometers with a peak wavelength at approximately 0.8 micrometer. In yet another embodiment, the lamp(s) are used to output activation energy having wavelengths from approximately 0.8 micrometer to approximately 5 micrometer with a peak wavelength at approximately 2.0 micrometer. In yet another embodiment, the lamp(s) are used to output activation energy having wavelengths from approximately 0.8 micrometer to approximately 5 micrometer with a peak wavelength at approximately 1.5-1.6 micrometer.

FIG. 3B schematically illustrates another preferred embodiment system 90 for applying a label with an activatable adhesive to an item such as a container. The system 90 generally comprises a printer unit designated as A in FIG. 3B, a thermal activation unit designated as B, and an applicator unit designated as C. The system also preferably comprises a control system (not shown) described in greater detail herein. The printer unit A applies printed text, indicia or other markings onto one or more labels or label assemblies. The label or label assemblies preferably carry a layer of pre-activated adhesive. The printer unit includes a label roll, a print roller, and a print head as schematically depicted in FIG. 3B. The printer unit may also comprise one or more ribbon sensors 25 for detecting movement, position, and/or characteristics of the printing ribbon. The ribbon sensor(s) 25 ensure that no ribbon is transported into the thermal activation unit B, with the labels.

The preferred system 90 also comprises a thermal activation unit B which activates the adhesive layer or regions of adhesive carried on the label or label assembly transported from the printer unit A. As label or label assemblies enter the thermal activation unit B, a cutter 1 cuts or otherwise forms the label or label assemblies into desired sizes and/or shapes. Cut or sized labels 3 are then transported through the thermal activation unit B by a transport unit 5 having a transport chain 4, conveyor or other suitable transport means. The transport chain 4 may be coated or otherwise receive one or more protective coatings. The transport chain 4 is configured to allow air flow therethrough and accommodate a relatively small bending radius. These characteristics promote a compact design and heat resistance. As the labels 3 are transported through the thermal activation unit B, the labels 3 are exposed to near infra red (NIR) radiation, such as emitted by one or more NIR lamps 10, 11, 12, and 13. The lamps 10, 11, 12, and 13 are preferably part of a lamp unit 19 which includes cooling units such as a first fan 8 that draws air into the region of interest, and a second fan 9 that exhausts air therefrom. The thermal activation unit B preferably includes one or more covers, the position of which is detected by cover switches such as switches 23 and 24. Preferably provided proximate the outlet for heated air exiting the thermal activation unit B, one or more lamp temperature sensor units 15 are provided. It is also preferred that one or more sensors be provided in and around the area in which the labels 3 are activated. For example, a first label sensor 16 is positioned proximate labels entering the activation area. A second label sensor 17 is positioned proximate labels exiting the activation area. These sensors review material of the incoming and outgoing labels, particularly the material position and completeness by analyzing the edges of the label. Upon detecting any differences, the control system will initiate an emergency stop. The sensors 16 and 17 are particularly suited for detecting a condition in which labels are burning or otherwise undergoing degradation. Specifically, the outputs from the sensors 16 and 17 can be compared, as performed by a comparator, and if sufficiently different from one another, can indicate the existence of a label degradation condition. For example, labels exiting the transport unit 5 having edges that were charred or curled would indicate a problematic and/or hazardous situation. An emergency shutdown sequence could then be initiated. A temperature sensor 18 may be used to analyze the temperature of the labels 3 or layers thereof. Specifically, the temperature sensor(s) 18 are used to control the activation temperature of the label. The transport unit is generally noted as 5 and may include infrared (IR) shielding 2 to prevent damage or exposure to infrared radiation by the fans 6 and 7. Fans 6 and 7 generally serve to exhaust relatively hot air away from the labels 3 and transport unit 5. The fans 6 and 7 are preferably located below the transport chain 4, or on an opposite side from the labels, to thereby assist in holding the label flat on the transport chain so that the labels do not contact any hot objects within this region.

The thermal activation unit B also preferably comprises one or more quartz glass plates, schematically depicted in FIG. 3B as item 14. The quartz glass plates 14 are positioned between the labels 3 and the lamps or emitters. The quartz glass plates 14 prevent contact from occurring between the emitters and the labels. In one embodiment, the area or region around the quartz glass plate(s) is enclosed and one or more large displacement or high speed fans are used to withdraw relatively hot air from the enclosed area. The hot air surrounding the emitters is thereby prevented from reaching or contacting the labels. The use of one or more quartz glass plates significantly increases the safety and dramatically reduces the potential for fire hazards resulting from labels igniting or burning. The use of the quartz glass plate(s) also serves to allow only particular wavelengths of light to pass through the plates and thereby reach the labels. Thus, the labels are only heated by a portion of the spectrum of radiation from the emitters.

Figure 23:
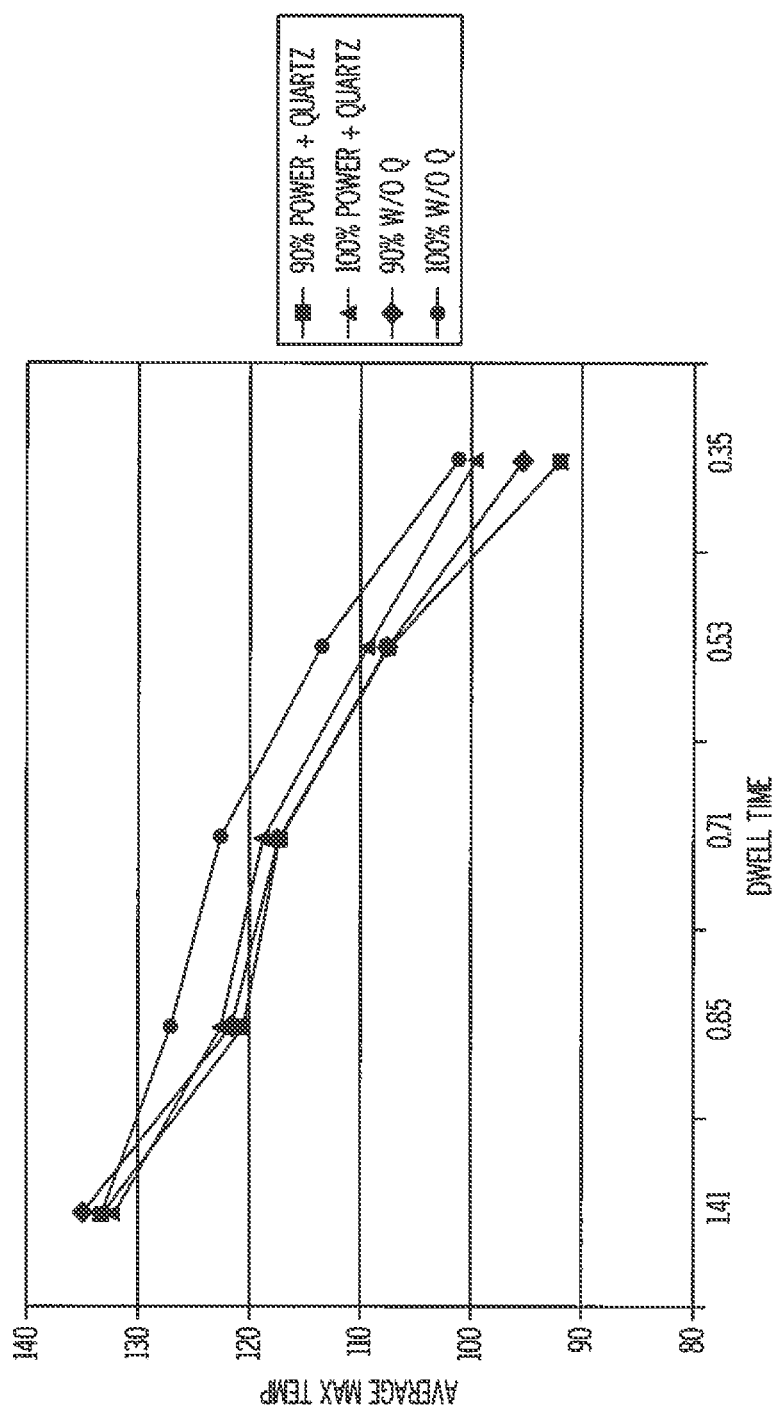
FIG. 23 is a graph illustrating various temperature and dwell time plots illustrating the effect of using quartz glass members.

FIG. 23 illustrates average maximum temperatures reached at various dwell times using emitters at 90% power and 100% power in two different arrangements. The emitters used were Fast Response Midwave IR Emitters from Heraeus Noblelight GmbH of Germany. In one arrangement, quartz glass plates are positioned between the emitters and the labels. In another arrangement, quartz glass plates are not used, and so the labels are fully exposed to the emitted radiation. The quartz members absorbed a portion of the emitter's energy thereby reducing the overall energy absorption by the label, as indicated by the somewhat lower temperatures. The quartz members are believed to block or otherwise hinder transmission of radiation from the emitters having wavelengths longer than 3.5 µm.

Referring to FIG. 3B again, after the labels 3 have been activated, they are transported to an applicator unit generally denoted as C in FIG. 3B. The applicator unit or transport applicator 26 applies the activated labels 3 onto the items of interest. One or more sensors such as sensor label progress sensors 20 and 21, and a sensor label stop position 22, are preferably used to control material transport. The number of sensors used generally depends upon the label size and shape. A movement sensor 28 may also be used to detect movement within the applicator unit C.

The system 90 may include additional sensors and control provisions. For example, the system 90 may include one or more signal interfaces between any of components A, B, and C. A Universal Signal Interface 27 is illustrated between components A and B. A start sensor or foot switch 29 can be used in conjunction with any of the components. The system 90 can include a programmable logic controller (PLC) or other control system as known in the art.

Figure 3C:
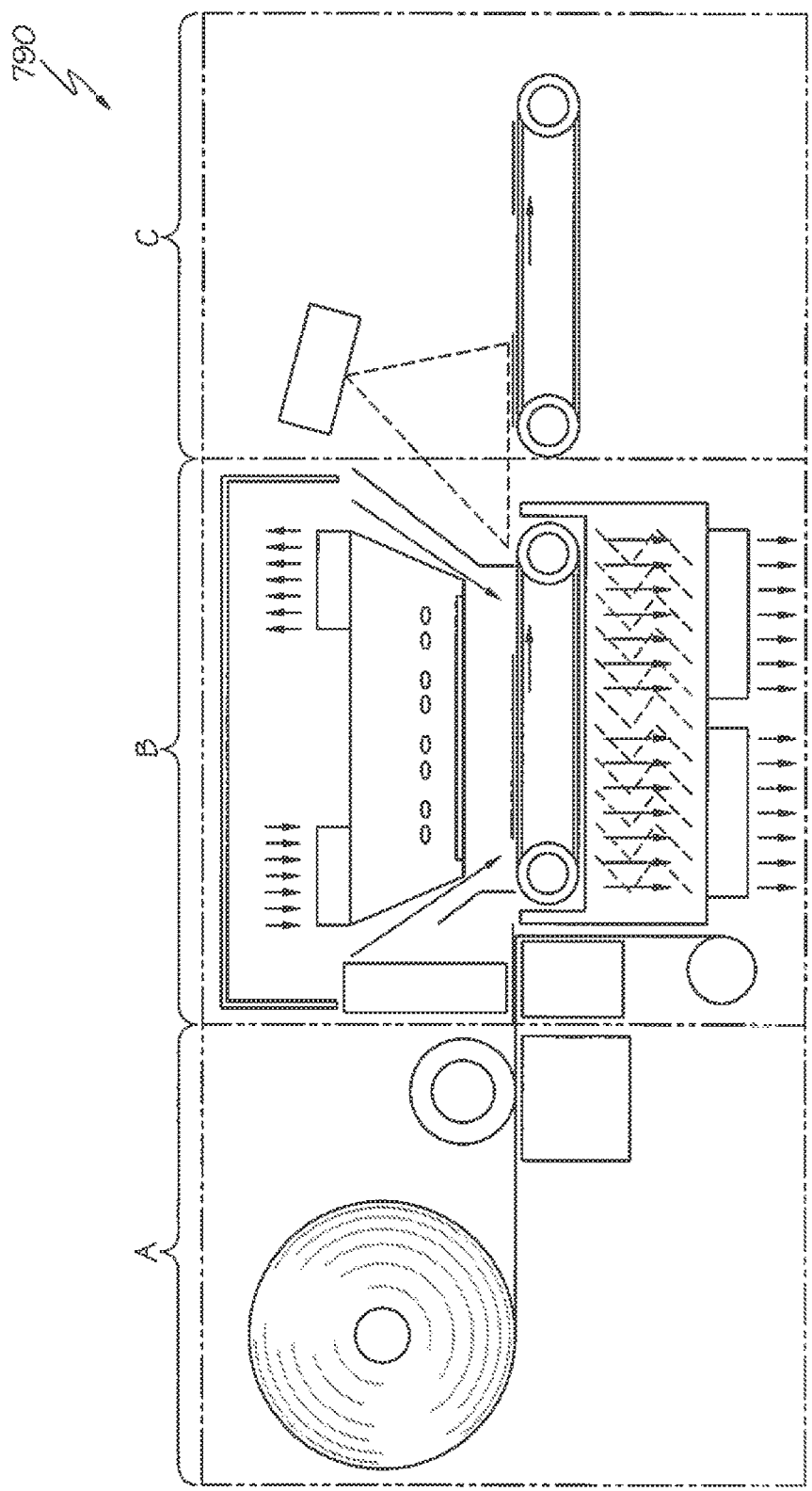
FIG. 3C is a diagram of yet another preferred system for applying a label with an activatable adhesive to an item.

FIG. 3C shows an exemplary embodiment of a system 790 using digital printing and laser cutting. System 790 is referred to herein as a Prime, Print & Apply System, where a continuous roll of labels is provided to the system. The system 790 generally parallels previously described system 90 of FIG. 3B and includes a printer unit A, a thermal activation unit B, and an applicator unit C. However, instead of a cutter 1 used in the system 90, a laser cutter 1a is used. And, instead of a print head and ribbon assembly as used in the system 90 shown in FIG. 3B, the system 790 preferably utilizes a digital printer. The remaining components in the system 790 are as previously described in conjunction with the system 90 of FIG. 3B. Generally, a web of labels is moved on a line to a digital printer where each label is printed to form indicia or other markings before the label is cut by a laser to a predefined shape. The label matrix is then separated from one or more substrate layer(s) kept in place on a vacuum belt or alike. The label matrix is driven to another direction and rewinds around a roller. The printed and cut labels are then transferred in the thermal activation area B using a conveyor, a vacuum belt or similar component, past a SWIR or MWIR source which activates each label in a fraction of second. The activated label is then transported to the product to which they are affixed in the applicator unit C. A belt applicator can be used for transporting and/or applying labels.

FIG. 3D shows an exemplary embodiment of a system 890 using digital printing and laser cutting. This system is also referred to as a Prime, Print & Apply System, where a continuous roll of labels is provided. The system 890 generally parallels the system 790 however uses a laser cutter 1b that is located further downstream, in the applicator unit C shown in FIG. 3D. In contrast and as previously described in conjunction with FIG. 3C, the laser cutter 1a is located between the printer unit A and the thermal activation unit B, and particularly, within the thermal activation unit B. In system 890, the web of labels is moved on a line to a digital printer where each label is printed to form indicia or other markings. The web of printed labels is then transferred in the thermal activation area B past a SWIR or MWIR source which activates each printed label in a fraction of second. The activated web of printed labels is then transferred to the applicator unit C where the web or plurality of labels is cut into a predetermined label shape by a laser while on a vacuum belt or alike. The label matrix is separated from the individual label which is kept in place on a vacuum belt or alike and winds up around a roller. The cut and activated label is then transported to a product to which they are affixed.

In another variant of the previously noted embodiments, the printer and laser cutting systems may also be placed after or downstream of the activation of the web. The prime printer prints indicia or other markings on the web of activated adhesive which is then cut in label shape using a laser while on a vacuum belt or alike. The label matrix is separated from the individual label which is kept in place on a vacuum belt or alike and winds up around a roller. The cut and activated label is then transported to the product to which they are affixed.

In yet another embodiment, the web of activatable linerless is pre-perforated to the shape of the labels. The web will follow the same path as in FIG. 3D but instead of laser cutting the activated labels, the web passes over a sharp edge that separates the leading edge of the label from the matrix. The label is then placed in contact with a receiving substrate, adhering to the substrate, upon which the matrix is separated therefrom.

FIG. 4 shows an exemplary method of applying a label 100 with an activatable adhesive 120 to an item 160. The method starts at step 260, and then, at step 270, a plurality of labels with a layer of activatable adhesive are provided. At step 280, a plurality of items with a second surface are provided, and at step 290, a source of energy 200 is provided. At step 300, the adhesive on the labels is exposed to radiation to render a tacky surface on the adhesive. At step 310, the label is applied to the item at a rate of approximately 500 labels per minute. The method ends at step 320.

FIG. 5 shows an exemplary method of activating a label 100. The method starts at step 330, and then, at step 340, the label with a layer of activatable adhesive 120, as defined in Table 1, is provided. At step 350, a source of energy 200 is provided, and, at step 360, the adhesive on the label is exposed to radiation so that the adhesive becomes tacky. The method ends at step 370.

Figure 6:
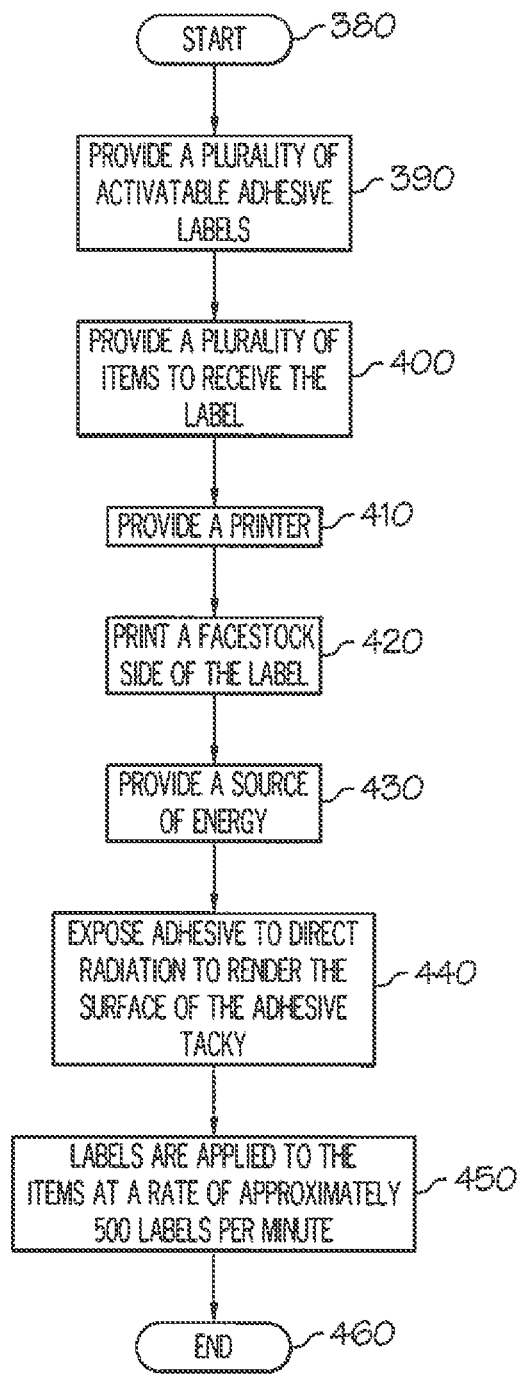
FIG. 6 is a flowchart of an exemplary method for printing, cutting and applying a label with an activatable adhesive to an item.

FIG. 6 shows an exemplary method of applying a label 100 with an activatable adhesive 120 to an item 160. The method starts at step 380, and then, at step 390, a plurality of labels with a layer of activatable adhesive are provided. At step 400, a plurality of items with a second surface is provided, and, at step 410, a printer 250 is provided. At step 420, the facestock 110 of the label is printed. At step 430, a source of energy 200 is provided. At step 440, the adhesive on the labels is exposed to radiation to render a tacky surface on the adhesive. At step 450, the label is applied to the item at a rate of approximately 500 labels per minute. The method ends at step 460.

FIG. 6A shows an exemplary method of applying a label such as label 100 depicted in FIG. 1 with an activatable adhesive 120 to an item such as a container 160 depicted in FIG. 2. The method starts at step 381, and then, at step 391, a roll of labels with a layer of activatable adhesive are provided. At step 401, a plurality of items with a second surface is provided, and, at step 411, a printer 251 is provided. Preferably, the printer is a digital printer. At step 421, the facestock 110 of the label is printed. At step 431 a cutter is provided. Preferably, the cutter is a laser cutting system. At step 441 the label is cut to a pre-set length. After cutting, an optional operation (not shown) may be performed in which the label matrix is separated and wound up. At step 451 a source of energy 200 (FIG. 2) is provided. At step 461, the adhesive on the labels is exposed to radiation to render a tacky surface on the adhesive. At step 462, the label is applied to the item, such as the container 160 in FIG. 2, at a rate in excess of 60 labels per minute. The method ends at step 463.

FIG. 6B illustrates another exemplary method of applying a label to an item such as a container. Upon initiating a start 1000, an operation 1005 of providing a roll of activatable adhesive labels is performed. In operation 1010, a plurality of items such as containers to receive the labels are provided. In operation 1015, a printer and preferably a digital printer is provided. The facestock side of the label is then printed in operation 1020. In operation 1025, a source of activating energy is provided. In operation 1030, the adhesive is exposed to direct radiation to render the surface of the adhesive tacky. A cutting system is provided in operation 1035. In operation 1040, the activated label is cut to a desired shape. In operation 1045, labels are applied to the items such as containers, and preferably at a rate of greater than 60 labels per minute. In operation 1050, the label matrix is separated and wound up. The end of the process is designated as operation 1055.

While the above methods mention an exemplary rate for applying a label 100 to an item 160 of approximately 500 labels per minute, the rate can range from greater than approximately 60 labels per minute to upwards of approximately 1,000 labels per minute. Example rates for applying a label to an item according to the methods of the present invention include approximately 120 labels per minute, approximately 250 labels per minute, and approximately 500 labels per minute.

Figure 7:
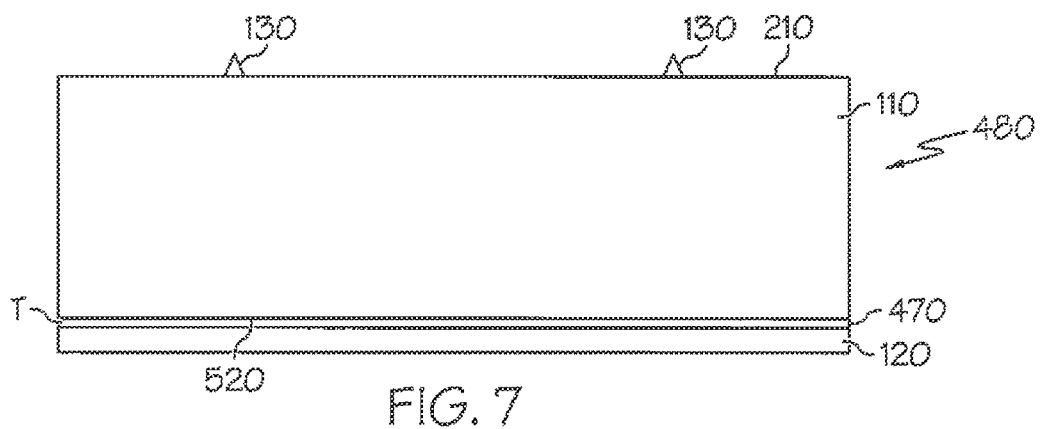
FIG. 7 is a sectional view of a label having a reflective layer where the reflective layer is continuous according to an embodiment of the invention.

As previously noted, NIR and Short Wave IR energies are efficient tools for activating the adhesives 120 in a rapid manner, but may cause damage to printed labels 100 due to absorption of the energy by the pigments in the indicia 130 that is printed on the facestock 110 of the labels. Referring additionally to FIG. 7, to overcome this issue a reflective layer 470 is introduced into the construction of another embodiment of a label 480. The reflective layer is placed between the facestock layer 110 and the adhesive layer 120. When the adhesive of the adhesive layer is directly exposed to NIR energy, some of the energy is absorbed as the radiation passes through the adhesive. The remaining, non-absorbed energy is reflected by the reflective layer and redirect back through the adhesive layer causing additional NIR energy to be adsorbed by the adhesive in the adhesive layer. Hence, not only is the indicia on the facestock layer protected by overheating, but the redirection of the radiation by the reflective layer allows for greater absorption of the energy by the adhesive, thus, requiring less residence time by the adhesive in the presence of the radiation to obtain the desired level of exposure to the radiation. Exposures of the adhesive layer to less than 0.3 seconds of radiation are possible with these methods using a NIR radiation source 200, and thus, activation and application rates of greater than approximately 250 labels per minute can be obtained. Generally, it is preferred to utilize electromagnetic radiation emitters to produce the desired radiation at relatively high intensities.

Referring to FIG. 7, the reflective layer 470 can be made with any material that reflects NIR energy. Suitable examples include gold, silver, aluminum and copper. Aluminum is the one of the best choices for the reflective layer's material in that aluminum is inexpensive compared with other suitable metals such as those previously listed; can easily be applied to the facestock 110 using various metallization techniques, including, for example, vacuum metallization or coating; and has greater than 95% reflectivity to NIR energy. The thickness "T" of the reflective layer can be as small as one micron and still provide suitable reflectivity, which can be, for example, greater than approximately 90%. It is understood that other reflective layers can be employed for other suitable radiation sources which would also help to protect the facestock from discoloration.

Figure 8:
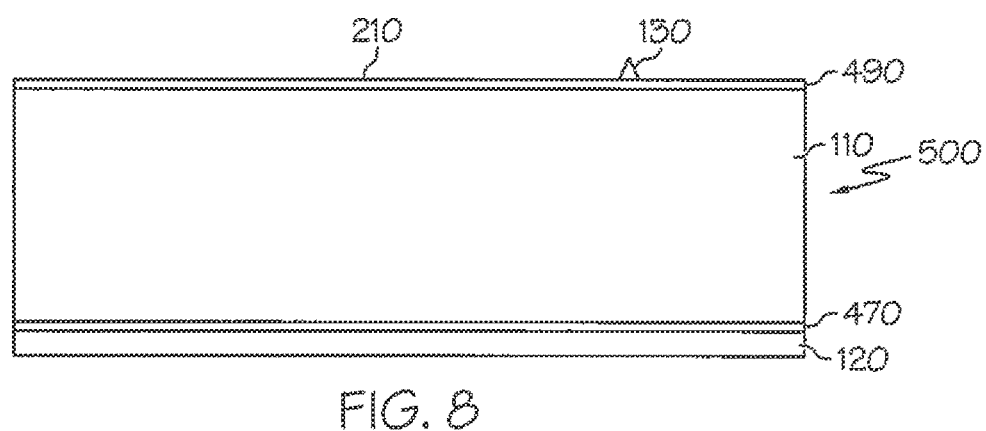
FIG. 8 is a sectional view of another label having an optional coating on the indicia bearing surface of the facestock according to an embodiment of the invention.

The label's facestock layer 110 can be constructed from any material that is receptive to the ink that is used to print the indicia 130 on the facestock layer. Example materials for the facestock layer include paper, polymer films, metallized paper, paper backed foil, and metallic foils. Referring additionally to the example embodiment illustrated in FIG. 8, these facestock materials can be treated with coatings 490. Examples include clear top coats, which can further enhance the facestock layer's ability to receive and retain the ink that is used to print/deposit the indicia on the facestock layer. Further examples include coatings that contain a high level of pigment, for example, titanium dioxide, which can be applied to the facestock layer to increase the opacity of the label 500.

Figure 9:
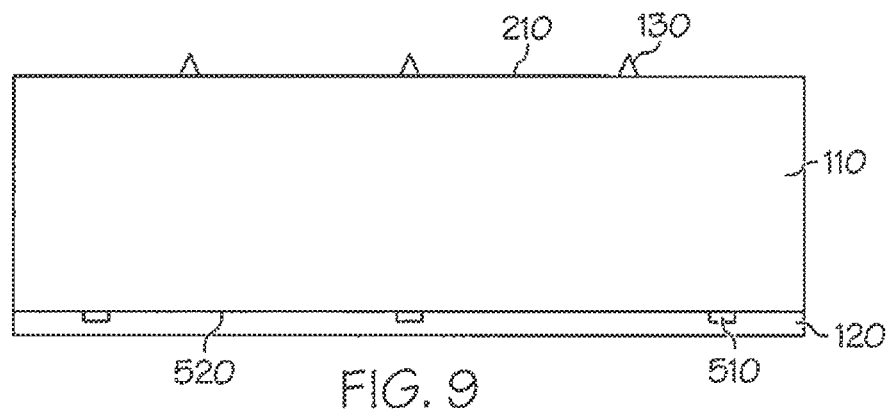
FIG. 9 is a sectional view of another label having a reflective layer where the reflective layer is patterned according to an embodiment of the invention.
Figure 10:
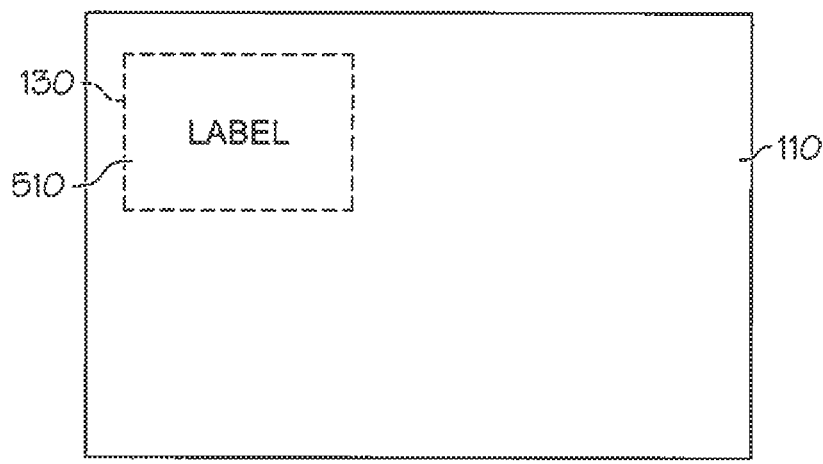
FIG. 10 is a top plan view of another label having a reflective layer where the reflective layer is patterned according to an embodiment of the invention.

Referring additionally to the example embodiment illustrated in FIG. 9, the reflective layer 470 can include a reflective pattern 510 that covers partially or in totality the non indicia bearing surface (also known as "back surface") 520 of the facestock layer 110. For example, referring additionally to FIG. 10, a reflective pattern 510 can be placed on the facestock layer so as to overly indicia 130 on the facestock layer's back surface when viewed through the label's adhesive layer. This reduces the amount of reflective material that is needed for the label's construction.

Figure 11:
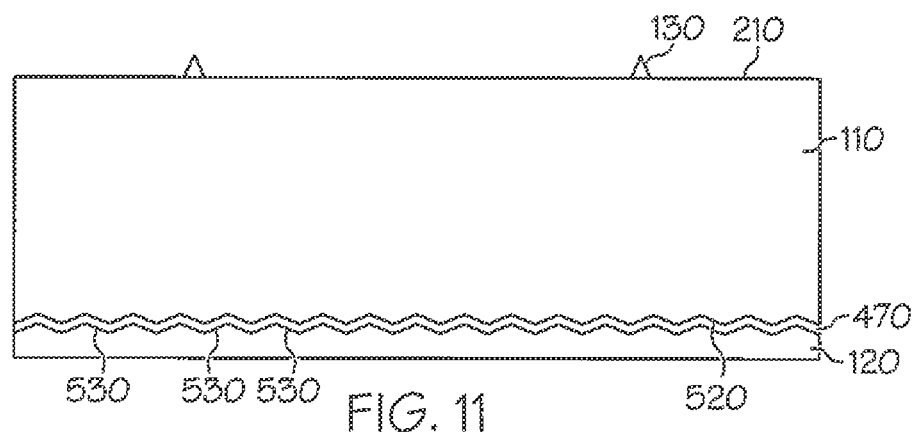
FIG. 11 is a sectional view of yet another label having a reflective layer where the reflective layer is retroreflective according to an embodiment of the invention.

Referring additionally to the example embodiment illustrated in FIG. 11, while the back surface 520 of the facestock layer 110 can be smooth, it is also possible that the back surface of the facestock layer can be textured. Vacuum metallization of the textured facestock layer, for example, can yield a textured reflective surface. Likewise, embossing of a smooth reflective layer 470 can yield a similar textured reflective surface. Such textured surfaces can be used to redirect radiation or improve reflection of radiation from radiation sources that are not perfectly perpendicular to the plane of the facestock. For example in FIG. 11, a retroreflective microtexture 530 is shown. U.S. Pat. No. 6,767,102 to Heenan et al. illustrates examples of various retroreflective surfaces. A retroreflector is a device or surface that reflects light back to its source with a minimum scattering of light. Thus, an electromagnetic wave front is reflected back along a vector that is parallel to, but opposite in direction from the wave's source.

Figure 12:
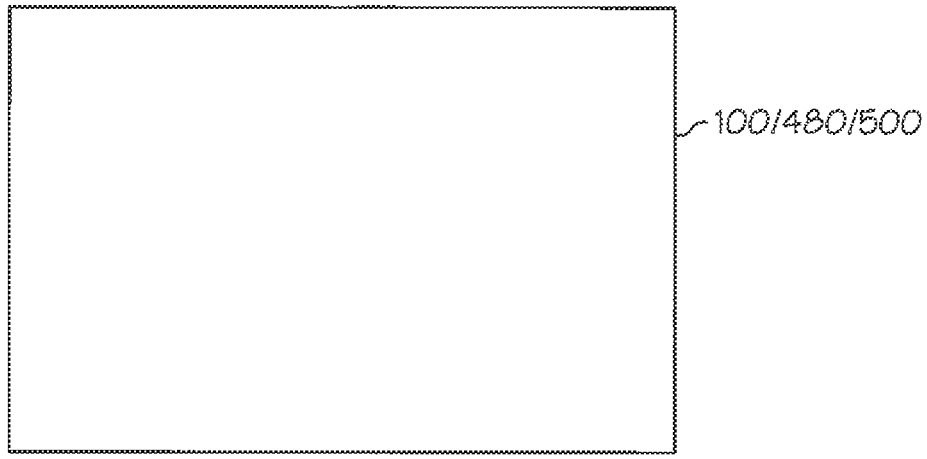
FIG. 12 is a top plan view of an exemplary rectangular label having angular corners according to the invention.
Figure 13:
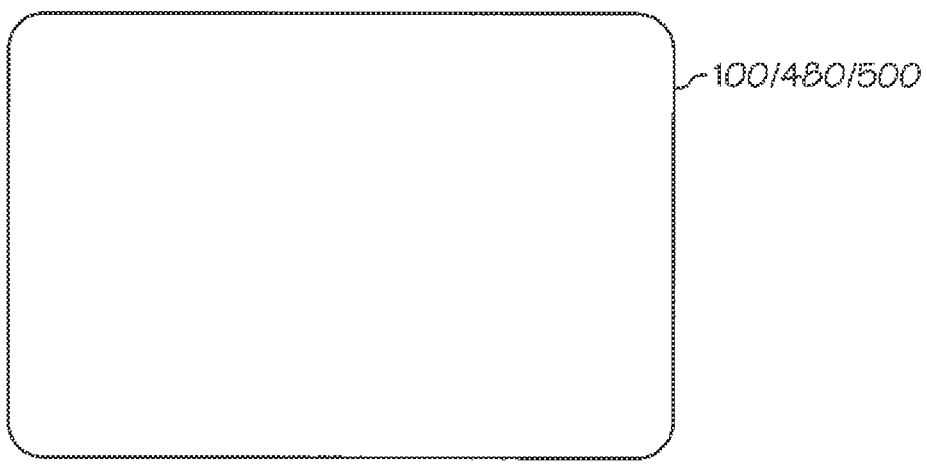
FIG. 13 is a top plan view of an exemplary rectangular label having rounded corners according to the invention.

The labels 100, 480, and 500 of the various embodiments of the invention can have a variety of sizes and shapes. For example, referring additionally to FIGS. 12 and 13, the width "W" of an exemplary rectangular label can range from approximately 0.5 centimeters to approximately 30 centimeters, and the length "L" of the exemplary rectangular label can range from approximately 0.5 centimeters to approximately 30 centimeters. Accordingly, the overall surface area of exemplary rectangular labels can range from approximately 0.25 square centimeters to approximately 900 square centimeters. The exemplary labels according to the invention can have any shape, for example, the labels can be rectangular, square, circular, and other shapes including irregular shapes. Examples of various label shapes are shown in U.S. Pat. Nos. 2,304,787, 2,569,140 and 2,783,172 to Avery Dennison.

The various labels and label systems described herein may further comprise one or more barrier coats or layers. Generally, a barrier coat prevents discoloration of the facestock and print under a wide array of conditions to which the label may be exposed. Preferably, the barrier coat prevents discoloration of the facestock and print upon exposure to temperatures of from about −20° C. to about 80° C., for times of up to several months or longer and preferably up to 1 year, and at humidity levels of from about 10% to 99%. Generally, such barrier coats comprise polymeric materials compatible with the adhesives described herein and which include an effective concentration of styrene moieties. In certain embodiments, the adhesive layer and the barrier layer can be coated with one pass using dual die technology.

In several of the preferred embodiment adhesive formulations, dicyclohexyl phthalate is used as a plasticizer and has a peak melting temperature at 63° C. Once the adhesive is activated by radiation or other energy source, the plasticizer stays in liquid form and may migrate from the adhesive layer to its contact area. The higher the temperature, the faster the migration. Thus, the barrier layer covers the adhesive side of a label, seals capillaries of facestock and serves as a barrier to minimize plasticizer migration from the adhesive side to the print side of the label.

Poly(vinyl alcohol) is a very commonly used material for an oxygen permeability barrier and dye migration barrier. However label construction with this poly(vinyl alcohol) layer produces a lower tack than that without this layer. From a compatibility point of view, a polymer material bearing styrene units should be more compatible. A mixture of one to one weight ratio of HYCAR 26288 and HYCAR 26315, both available from Lubrizol Corp. of Cleveland, Ohio, is an example of a preferred formulation for use as a barrier coating or layer. Both polymers include styrene moiety in their molecular backbone. The coat weight of the barrier layer also impacts the adhesive performance as well, since plasticizer will be absorbed by the barrier layer. Since plasticizer is "consumed" by the barrier layer, the higher the barrier layer coat weight, the lower the adhesive tack. The preferred barrier layer coat weight is below 12 g/m² (gsm). The most preferred coat weight is in between 2 to 10 g/m² (gsm). The barrier layer is preferably used to cover the adhesive side of the label and to seal capillaries of the facestock. For this reason, polymeric substances having glass transition temperatures less than 80° C. are preferred. The most preferred glass transition temperature is lower than 60° C.

Figure 14:
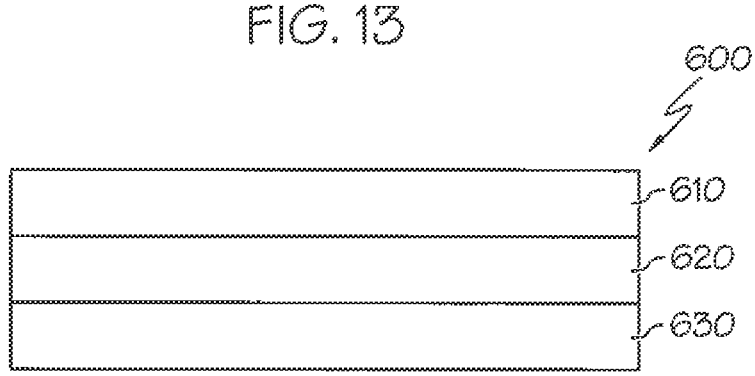
FIG. 14 is a schematic illustration of a preferred embodiment layered array in accordance with the invention.

The present invention adhesives can be used in a wide range of layered arrays. Generally, such arrays include a substrate, one or more functional layers such as reflective layers and/or barrier layers, and one or more layers of the adhesive, which is preferably in the form for use as a linerless adhesive. FIG. 14 schematically illustrates a layered assembly 600 comprising a layer 610 of a linerless adhesive, a substrate 630, and a barrier layer 620 disposed between the adhesive layer 610 and the substrate 630. The substrate is preferably a paper facestock or a transparent film substrate such as PET and BOPP, etc. As illustrated in FIG. 14, the barrier material, which also functions as a binder layer, is coated on the substrate 630, followed by coating the adhesive 610 on the barrier layer 620 by direct coating techniques. The barrier layer 620 can be coated on the film substrate 630 by either direct coat or transfer coat techniques. In general, such adhesives include materials that have relatively low melting points such as in the range of 50° C. to 120° C., which includes organic materials such as plasticizers, tackifiers, and combinations. The inclusion of such relatively low melting point materials in the adhesives imparts a resulting activation temperature of such adhesive within this range of temperatures. Upon heating, the molecules of the solid plasticizer, and/or tackifier will be absorbed and interact with the adhesive base polymer at a molecular level to provide an either permanent or removable pressure sensitive paper or film label construction.

Additionally, the barrier layer can enhance the anchorage of the adhesive with a wider drying temperature range during adhesive coating process. In addition, the barrier layer also serves as a guard to minimize bleeding of plasticizer from the adhesive side to the facestock. Furthermore, the barrier layer can have a thickness of less than 12 microns and have a glass transition temperature lower than 80° C.

Referring to FIG. 14, the barrier layer 620 can be a polymeric material having a glass transition temperature less than 80° C. and with a thickness less than 12 microns. The primer layer can be applied by traditional coating methods, such as knife coating, roll coating, and die coating.

In certain embodiments, and as described herein, carbon black or other like agent(s), are incorporated into one or more layers of a label assembly to promote activation of the adhesive. Generally, the incorporation of carbon black reduces energy consumption for the activation process. Reduced energy consumption may be exhibited or result in cost savings, higher processing speeds, and/or further promote "green" aspects of the technology. Moreover, incorporating carbon black in one or more layers or a label assembly enables isolation of lamps or other radiation emitters for adhesive activation. Additionally, incorporating carbon black in one or more layers of a label assembly enables the distance between the lamps or radiation emitters, and the labels to be increased, thereby further promoting safety of the system.

The carbon black or other alternate mediums, when incorporated into a label or label assembly promote energy absorption of the material, thereby leading to improved efficiencies. The carbon black can be incorporated into any layer of a label assembly. However, it is generally preferred that the carbon black be incorporated within the adhesive layer. However, the invention is not limited to such and includes the incorporation of carbon black in other layers in addition to or instead of the adhesive layer. For example, carbon black can be incorporated in a barrier layer. It is also contemplated that carbon black or other like agent(s) can be incorporated in a primer layer. If carbon black is used in a primer or barrier layer, it can be used at the previously noted concentrations as when incorporated in an adhesive layer. However, for many applications, it is preferred to use carbon black at higher concentrations such as about 0.1%.

It is noted that other agents can be used instead of or in addition to carbon black for promoting energy absorption. Non-limiting examples of such other agents include various organic dyes, coloring agents, and pigments; and various inorganic dyes, coloring agents, and pigments. It will be understood that a wide array of inks or other agents could be used. Moreover, combinations of any of these can be used. It is contemplated that combinations of agents can be incorporated in multiple or different layers of a label assembly. For example, carbon black can be incorporated into an adhesive layer and one or more organic and/or inorganic dyes can be incorporated in a barrier layer.

The concentration of the carbon black or other like agent(s) in the layer of interest can vary, so long as the concentration beneficially promotes energy absorption into that layer and an increase in temperature. For example, when incorporating carbon black into an adhesive or barrier layer, generally the concentration is at least about 0.1%, and preferably at least about 1%. The upper limit depends on numerous factors.

Systems

The present invention also provides various systems using the activatable adhesives, and layered arrays and/or label assemblies described herein. In one preferred aspect, a system for applying printed labels to an article comprises an activatable label including a layer of selectively activatable adhesive that exhibits an activation time of less than 1 second, and an apparatus configured to apply the label to an article. The apparatus includes an energy source that is configured to emit energy, and one or more actuators that are configured to (i) receive the activatable label, (ii) transport the activatable label through the emitted energy, and (iii) transport the activatable label to a position at which the activatable label is applied to the article. The activatable adhesive preferably exhibits the characteristics noted herein associated with the preferred adhesives such as an activation time of less than 1 second, more preferably less than 0.5 seconds, and most preferably of about 0.3 seconds or less. The adhesives also preferably exhibit an open time of from about 0.1 seconds to about 72 hours, and more preferably of from about 10 seconds to 60 seconds. The adhesives used in these systems also exhibit certain preferred initial tack properties as described herein.

Another preferred embodiment system comprises an activatable label including a layer of selectively activatable adhesive that upon activation, exhibits an open time of at least 72 hours, and an apparatus configured to apply the label to an article. The apparatus includes an energy source that is configured to emit energy, and one or more actuators that are configured to (i) receive the activatable label, (ii) transport the activatable label through the emitted energy, and (iii) transport the activatable label to a position at which the activatable label is applied to the article. As previously noted, the adhesives used in this system preferably exhibit the previously noted activation times, and initial tack values.

Uses

The adhesives described herein can be used in a wide array of applications. A preferred use is in layered arrays such as label assemblies.

The various layered arrays and label assemblies can be used in numerous applications such as for example, receiving printed indicia, information, designs, and the like. A particularly preferred use for label assemblies as described herein is use in printers.

EXAMPLES

Exemplary procedures for preparing the base polymer noted in Table 2, are as follows:

Example 1

An emulsion adhesive polymer base is prepared by emulsion polymerization from a plurality of monomers consisting of 37.2% butyl acrylate (BA), 29.3% styrene, 29.3% methyl methacrylate (MMA), 1.7% methacrylic acid (MAA), and 2.5% acrylic acid (AA), based on the weight of all monomers, with 0.06% by weight of n-dodecy mercaptan added as a chain transfer agent. A one-liter, jacketed, cylindrical reaction flask equipped with a four-neck flask head was fitted with a steel stirring rod with multiple steel blades, a reflux condenser, a thermometer, and a nitrogen inlet tube. The stirring speed is set at approximately 126 rpm, and the reaction temperature was set at 80° C. A reactor pre-charged solution is made by dissolving 1.0 g of HITENOL BC-10 (97% solids, manufactured by Dai-Ichi Kogyo Seiyaku Co., Ltd. of Kyoto, Japan) surfactant in 100 g deionized ("DI") water. A pre-emulsion feed soap solution is formed by dissolving 2.0 g HITENOL BC-10 and 105 g DI water. A monomer mix is made up with 140 g of n-butyl acrylate, 110 g styrene, 110 g of methyl methacrylate, 6.5 g of methacrylic acid, 9.1 g of acrylic acid, and 0.24 g of n-dodecyl mercaptan. The monomer mix is added to the pre-emulsion solution under stirring for 10 min. An initiator solution A is prepared by dissolving 0.75 g potassium persulfate ("KPS") in 67 g of DI water; solution B is made by dissolving 0.5 g of KPS in 67 g of DI water. A kickoff initiator solution is prepared by dissolving 0.75 g of KPS in 38 g of water. The reactor pre-charged solution is introduced to the glass reactor, which has been flushed with nitrogen. The kickoff initiator solution is added when the solution temperature reached 80° C. After 5 minutes, 20 g of the pre-emulsion solution was introduced into the reactor. Upon observing polymerization, the pre-emulsion solution and initiator solution A feeds are started. Initiator solution B is fed at the end of solution A. The pre-emulsion solution feed is completed in a 4 hour period, and the initiator solution A and B feeds are completed in 4 hours and 15 minutes. Polymerization continues for another 30 minutes after completion of the initiator solution B feed. The polymerization temperature is maintained at 80° C. during the polymerization. Polymerization of the monomer mixture yields a polymer latex, which can be formulated further for linerless adhesives, and which can be coated on the desired substrates.

Example 2

The same polymerization procedure that is used in Example 1 is used, except that the monomers used for the polymerization are used in the following weight percentages. 48.0% BA, 23.9% styrene, 23.9% MMA, 1.7% MAA, and 2.5% AA.

Preparation of an exemplary white heat-activated adhesive is as follows. A switchable adhesive formulation is prepared from the noted adhesive polymer base by blending with a selected plasticizer and tackifier at room temperature for enough time to ensure a homogenous composition. Typically, the preferred melting point of such solid plasticizer is above 40° C. In this example, ground plasticizer dicyclohexyl phthalate or U250M supplied by Unitex Corp. of Greensboro, N.C. is used. The melting point of U250M is in the range of 63° C. to 65° C. The exemplary tackifier is TACOLYN 3400 (softening point 92° C.) which is a resin dispersion by Eastman Chemical Company of Kingsport, Tenn. TACOLYN 3400 is a resin ester dispersion. More specifically, TACOLYN 3400 is an aqueous, 55% solids, solvent-free anionic rosin ester dispersion prepared from a highly hydrogenated, high softening point resin. Not to be held to any particular theory, it is believed that when the adhesive is irradiated, the selected plasticizer is melted. The small plasticizer molecules are able to slip in between the adhesive base polymer chains to function as a "lubricant", even after the polymer cools. As a result, the free volume of the polymer is increased, or the glass transition temperature ($T_g$) of the adhesive polymer base is lowered, which leads to highly flexible adhesive coating. Advantageously, in certain exemplary embodiments, the adhesive does not include carbon black, graphite, ink(s), dye(s), pigment(s), and/or colorant(s). However, other exemplary embodiments of the adhesive include the use of such agents.

Example 3

An acrylic emulsion based polymer particularly adapted for linerless heat-activatable adhesives was prepared as follows. Referring to Table 4 below, a reactor charge is made by dissolving 18.2 g HITENOL BC-10 surfactant (97% solids), 18.2 g POLYSTEP B-19 surfactant available from Stepan of Northfield, Ill. (sodium lauryl ether sulfate, 32.5% solids), and 1.1 g DREWPLUS L-198 foam control agent available from Ashland Aqualon of Ashland, Inc. of Lexington, Ky., in 19.376 kg of deionized ("DI") water. This is summarized as reactor charge (A) in Table 4. As described later herein, 90.8 g of potassium persulfate ("K-persulfate") is subsequently added to this charge prior to pre-emulsion feed.

TABLE 4

Exemplary Reactor Charge

| | | Parts by Weight | |
|---|---|---|---|
| | | g | Lbs |
| A) | Reactor Charge: | | |
| | Di-water | 19,376 | 42.718 |
| | POLYSTEP B-19 (32.50%) | 18.20 | 0.04 |

TABLE 4-continued

Exemplary Reactor Charge

|  |  | Parts by Weight | |
| --- | --- | --- | --- |
|  |  | g | Lbs |
|  | HITENOL BC-10 (97.0%) | 18.20 | 0.04 |
|  | DREWPLUS L-198 (100.0%) | 1.10 | 0.002 |
|  | Kick-off K-persulfate | 90.80 | 0.20 |
|  | Total | 19,504.30 | 43.00 |
| B) | Soap Solution: | | |
|  | Di-water | 14,455 | 31.868 |
|  | POLYSTEP B-19 (32.50%) | 853.52 | 1.88 |
|  | AEROSOL OT-75 (75.0%) | 227.00 | 0.50 |
|  | HITENOL BC-10 (97.0%) | 472.20 | 1.04 |
|  | DREWPLUS L-198 (100.0%) | 1.10 | 0.002 |
|  | Total | 16,008.80 | 35.29 |
| C) | Monomer Mix: | | |
|  | BA | 5248 | 11.57 |
|  | EA | — | — |
|  | Styrene | 31,919 | 70.37 |
|  | MMA | 1333 | 2.94 |
|  | MAA | 508.48 | 1.12 |
|  | AA | 708.24 | 1.56 |
|  | EGDMA | 621.98 | 1.37 |
|  | n-DDM | 771.80 | 1.70 |
|  | Total | 41,110.50 | 90.63 |
| D) | Catalyst Solution for Delay Addition: | | |
|  | Di-water | 4213 | 9.29 |
|  | K-persulfate | 108.96 | 0.24 |
|  | Total | 4321.96 | 9.53 |
| E) | Rinse Di-water | 227.00 | 0.50 |
| F) | 19% Ammonia Solution: | 272.40 | 0.60 |
| G) | DREWPLUS L-198 | 18.20 | 0.04 |
| H) | ACTICIDE GA (1.50%) | 4.54 | 0.01 |
| I) | Di-water | 227.00 | 0.40 |
|  | Batch Total | 81,694.7 | 180.00 |
|  | Surfactants: | 2.248 pphm | |
|  | K-persulfate: | 0.481 pphm | |

The reactor charge was then introduced into a reactor and heated to 78° C. The reactor contents are preferably agitated.

A soap solution is formed for pre-emulsion as follows. 853.52 g of POLYSTEP B19, 227 g of AEROSOL OT-75 surfactant available from Cytec Industries, Inc. of West Paterson, N.J. (sodium dioctyl sulfosuccinate), 472.2 g of HITENOL BC-10, and 1.1 g DREWPLUS L-198 were added to 14.455 kg of deionized water. This is summarized as soap solution (B) in Table 4.

A monomer mix is formed by combining 5248 g BA, 31.919 kg styrene, 1333 g MMA, 508.48 g MAA, 708.24 g AA, 621.98 g EGDMA, and 771.8 g n-DDM. This is summarized as monomer mix (C) in Table 4. Expressed as a weight percentage based upon the adhesive polymer base, the concentrations of these monomers are 12.8% BA, 77.6% styrene, 3.2% MMA, 1.2% MAA, and 1.7% AA, 1.5% EGDMA, and 1.9% n-DDM.

The monomer mix (C) is added to the soap solution (B) while agitating to form a stable monomer mix (B+C) pre-emulsion. Preferably, the mix (B+C) is subjected to slow agitation while feeding as described below in Table 5.

TABLE 5

Details of Pre-Emulsion Mix

| Delay Addition: | Amount Lbs | Time Minute | Rate Lbs (g)/min. |
| --- | --- | --- | --- |
| Pre-emulsion (B + C) (1) | 125.92 | 200.00 | 0.63 (285.8 g) |
| Pre-emulsion (B + C) (2) | — | — | — |
| Catalyst Solution (D) | 9.53 | 200.00 | 0.048 (21.8 g) |

A catalyst solution for delay addition is formed by adding 108.96 g potassium persulfate to 4213 g deionized water.

At a reactor contents temperature of 78° C., the 90.8 g of potassium persulfate are added. The reactor contents are purged with nitrogen for 2 minutes. After the noted 2 minutes, the nitrogen purge is discontinued and a first portion of the pre-emulsion (B+C) is fed to the reactor and introduced to the reactor charge (A).

The pre-emulsion (B+C) is fed to the reactor for 30 minutes. After 30 minutes, a catalyst solution (D) is then administered to the reactor. As summarized in Table 4 under (D), the catalyst solution includes 108.96 g of potassium persulfate in 4213 g deionized water.

After administering the catalyst solution (D) to the reactor, the reactor batch temperature is increased and maintained at 86±3° C. The batch is agitated as needed.

Upon addition of the pre-emulsion (B+C), one half of an additional amount of deionized water in an amount of 113.5 g is used to rinse the tank previously retaining the pre-emulsion (B+C) and that portion of rinse water is then added to the reactor.

After the catalyst solution (D) has been fully administered to the reactor, the batch is maintained at a temperature of from about 82° C. to about 85° C. for 20 minutes.

After expiration of the noted 20 minute period, concentration of residual monomers in the batch is measured. Once the concentration of residual monomers is less than 0.05%, cooling of the batch to 35° C. is initiated. If the concentration of residual monomers is not less than 0.05%, the batch temperature of 82° C. to 85° C. is held for an additional 30 minutes and then allowed to cool to 35° C.

As the temperature of the batch cools, a 19% ammonia solution (F) in Table 4, is slowly added beginning once the temperature reaches 70° C. Specifically, 272.4 g of 19% aqueous ammonia solution are added. After addition of the ammonia solution, another amount of DREWPLUS L-198 is added. This is designated as (G) in Table 4 and constitutes 18.2 g of DREWPLUS.

Once the temperature of the batch reaches 35° C., 4.54 g of ACTICIDE GA, an industrial microbiocide available from Acti-Chem Specialties of Trumbull, Conn. is added. This is shown as (H) in Table 4.

Additional amounts of deionized water can be added to adjust for desired solids content and viscosity. For example, as noted in Table 4 as (I), 227 g of deionized water is added to the resulting product.

Additional processing operations can be performed such as filtering. An example of a representative filtering operation is filtering the product through a 25 micron or 50 micron filter.

Table 6 summarizes representative specifications for the resulting emulsion based polymer product. The resulting dry base polymer has a weight average molecular weight of 23,000 Daltons and a glass transition temperature of 76° C.

TABLE 6

Emulsion Based Polymer Product

| Specifications: | pH: 6.0-7.0 | Total Solids: 53.0 ± 0.5% |
|---|---|---|
| Grits: <50 ppm. on 50 micron filter | | Reactor Fouling: very slight |
| Viscosity: 1,000-3,500 Cps., #3 Spindle/30 rpm/25° C./LVT | | |
| Residual monomers: <0.05% | | |

Example 4

An emulsion-based adhesive system was prepared by using the acrylic emulsion based polymer formed in Example 3. Specifically, the adhesive system was formed as set forth in Table 7.

TABLE 7

Exemplary Adhesive System

| Component | Parts by Dry Weight |
|---|---|
| Polymer of Example 3 (Adhesive Polymer Base) | 25.00 |
| UNIPLEX 250 dispersion (Plasticizer) | 66.00 |
| ARAKAWA SE-E 650 dispersion (Tackifier) | 9.00 |
| Total | 100.00 |

Specifically, the adhesive system is prepared by combining 25 parts by weight of the polymer produced in Example 3 with 66 parts by weight of UNIPLEX 250 dispersion and 9 parts by weight of ARAKAWA SE-E 650 dispersion available from Arakawa Chemical of Osaka, Japan. The UNIPLEX 250 dispersion was prepared by milling UNIPLEX 250, water, dispersant and defoamer, and serves as a plasticizer. And, the ARAKAWA component serves as a tackifier.

This emulsion based adhesive is stable, can be directly coated onto papers or films and dried in an air-circulated oven up to 56° C. for 15 minutes without any sign of activation. The dried adhesive shows very good anchorage to primed or unprimed papers and film and passes blocking test at 45° C. under 30 psi pressure (about 206,842 Newton/$m^2$).

This type of adhesive exhibits excellent tack and good adhesion to non-polar surfaces and cardboards as well as remains very tacky greater than 48 hours and clear for a long period of time after activation under one or more IR lamps for 5 to 10 seconds.

Example 5

In this investigation, various formulations of heat or inherently near to mid IR (MWIR) activatable switchable adhesives were investigated. A set of switchable adhesive formulations were prepared from the polymers previously described in Example 2 using base emulsion polymers by blending with a selected plasticizer, however, without the selected tackifiers as illustrated in Table 8, below. The preferred plasticizers are solid plasticizers, i.e., the materials are in a solid state below the application temperature. Typically, the preferred melting point of such solid plasticizer is above 40° C. In the following adhesive examples, a ground plasticizer U250M from UNIPLEX 250 which is supplied by Unitex Corp. is used. The melting point of U250M is in the range of 63° C. to 65° C. When NIR to MWIR radiation is used to irradiate the adhesive, the selected plasticizer is melted. As noted, it is believed that the relatively small plasticizer molecules are able to slip in between the base polymer chains to function as a "lubricant", even after the polymer cools. As a result, the free volume of the polymer is increased, or the glass transition temperature of the base polymer is lowered, which leads to a highly flexible adhesive coating, and the G' or G" can be lowered to satisfy the Dalquist's criteria (the G' at room temperature is approximately $5 \times 10^5$ to $2 \times 10^6$ dyne/$cm^2$) for a linerless label application, such as for the preferred embodiments of the present invention. Details as to Dalquist's criteria are provided after the description of the examples herein. In addition, in the adhesive formulations of Example 5, noted amounts of water and a surfactant available under the designation IGEPAL CO-887 were included. The water/IGEPAL CO-887 mixture was prepared by combining 9 parts of water and 1 part of IGEPAL CO-887. IGEPAL CO-887 is a nonylphenoxy poly(ethyleneoxy) ethanol from Rhodia of New Brunswick, N.J.

TABLE 8

Compositions of Adhesive Example 5a-5d

| | Weight (g) | | | Composition (wt % on dry) | |
|---|---|---|---|---|---|
| Example | Base polymer | U250M | Water/IGEPAL CO-887 | Base Polymer | U250M |
| 5a | 40 | 20 | 20 | 50 | 50 |
| 5b | 40 | 28 | 20 | 41.67 | 58.33 |
| 5c | 40 | 36 | 20 | 35.71 | 64.29 |
| 5d | 40 | 44 | 20 | 31.25 | 68.75 |

Thermal analysis was then performed on the resulting adhesives to determine the effect of the selected plasticizer on the rheology behavior of the formulated adhesives.

The adhesive samples of Examples 5a-5d are inherently NIR to MWIR radiation activatable. Within up to at least ten minutes, non-reversible tack was developed when the samples were subjected to NIR to MWIR irradiation, though, a conventional heat source can also be applied to activate the adhesive at an elevated temperature. Adhesion tests using the sample 5a were performed on different substrates, and the results are listed below in Table 9. Details as to procedures and practices for measuring adhesive characteristics such as via 90° peel tests, tack measurements, and failure mode determinations are set forth herein after description of the examples.

TABLE 9

90° Peel Test of Example 5a

| Substrate | Sample | Dwell Time | Coat-weight (g/$m^2$) | (Newton/in) Average | (lbf/in) Average | Failure Mode |
|---|---|---|---|---|---|---|
| glass | 5a | 20 min | 26.0 | 5.492 | 1.235 | Slight stain |
| stainless steel | 5a | 20 min | 26.0 | 6.399 | 1.439 | Slight stain |
| cardboard | 5a | 20 min | 26.0 | 2.359 | 0.530 | Clean |

The effect of selected tackifier in the preferred embodiment adhesives is further demonstrated in the following examples involving samples Example 5e and Example 5f.

Figure 15:
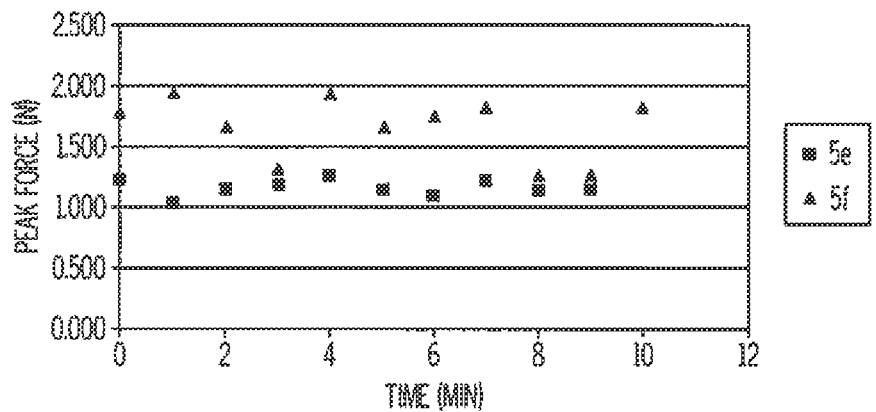
FIG. 15 is a SPAT probe test of several preferred embodiment adhesive compositions illustrating changes in tack over time after activation.

Adhesive compositions of Examples 5e and 5f are shown in Table 10, and the effect of the selected TACOLYN 3400 tackifier (having a softening point of 92° C.), a resin dispersion by Eastman Chemical, on the switchable adhesive adhesion performance is illustrated in Table 11. Example 5f shows a dramatic increase in adhesion on all substrates, and paper failure mode is achieved within a short dwell time. A preferred application and use of the preferred embodiment switchable adhesives is in label applications, which generally require that the activated adhesive has PSA properties for lamination. FIG. 15 demonstrates that a preferred embodiment adhesive has good adhesive open time after MWIR activation to meet such needs for the label lamination. As demonstrated in Table 11, the preferred embodiment switchable adhesives are inherently NIR to MWIR radiation activatable, and they have good adhesion on a broad range of substrates including high as well as low surface energy surfaces.

TABLE 10

Compositions of Switchable Adhesive Example 5e and 5f

| Example | Base Polymer (g) | U250M (g) | TACOLYN 3400 (g) | Water/IGEPAL CO-887 (g) | Base Polymer (%) | U250M (%) | TACOLYN 3400 (%) |
|---|---|---|---|---|---|---|---|
| 5e | 80 | 80 | 0 | 40 | 33.33 | 66.67 | 0 |
| 5f | 80 | 80 | 80 | 40 | 24.39 | 48.78 | 26.83 |

TABLE 11

90° Peel Test of Switchable Adhesive Examples 5e and 5f with NIR Activation
90° Peel Test @ 12 ipm

| Substrate | Sample | Dwell Time | Coat-weight (g/m²) | (Newton/in) Average | (lbf/in) Average | Failure Mode |
|---|---|---|---|---|---|---|
| Glass | 5e | 20 min | 26.0 | 5.492 | 1.235 | Slight stain |
| | 5e | 1 hour | 26.0 | 6.852 | 1.540 | Slight stain |
| | 5e | 5 hours | 26.0 | 6.644 | 1.494 | Slight stain; some paper tear |
| | 5e | 24 hours | 26.0 | 8.016 | 1.802 | Paper tear |
| | 5e | 72 hours | 25.0 | 11.52 | 2.589 | Paper tear |
| | 5f | 20 min | 25.0 | 13.46 | 3.026 | Paper tear |
| | 5f | 1 hour | 25.0 | 13.65 | 3.068 | Paper tear |
| | 5f | 5 hours | 25.0 | 12.58 | 2.829 | Paper tear |
| | 5f | 24 hours | 25.0 | 10.69 | 2.402 | Paper tear |
| | 5f | 72 hours | 25.0 | 14.29 | 3.213 | Paper tear |
| Stainless Steel | 5e | 20 min | 26.0 | 6.399 | 1.439 | Slight stain |
| | 5e | 1 hour | 26.0 | 7.634 | 1.716 | Slight stain |
| | 5e | 5 hours | 26.0 | 7.541 | 1.695 | Slight stain |
| | 5e | 24 hours | 26.0 | 7.823 | 1.759 | Paper tear |
| | 5e | 72 hours | 26.0 | 10.41 | 2.341 | Paper tear |
| | 5f | 20 min | 25.0 | 12.46 | 2.802 | Paper tear |
| | 5f | 1 hour | 25.0 | 14.61 | 3.284 | Paper tear |
| | 5f | 5 hours | 25.0 | 13.14 | 2.954 | Paper tear |
| | 5f | 24 hours | 25.0 | 7.619 | 1.713 | Paper tear |
| | 5f | 72 hours | 25.0 | 13.43 | 3.019 | Paper tear |
| Cardboard | 5e | 20 min | 26.0 | 2.359 | 0.530 | Clean |
| | 5e | 1 hour | 26.0 | 2.276 | 0.512 | Clean |
| | 5e | 5 hours | 26.0 | 3.130 | 0.704 | Clean |
| | 5e | 24 hours | 26.0 | 2.387 | 0.537 | Some fiber tear |
| | 5e | 72 hours | 26.0 | 6.079 | 1.367 | Paper tear |
| | 5f | 20 min | 25.0 | 5.404 | 1.215 | CB tear |
| | 5f | 1 hour | 25.0 | 2.803 | 0.630 | CB tear |
| | 5f | 5 hours | 25.0 | 3.802 | 0.855 | CB fiber tear |
| | 5f | 24 hours | 25.0 | 5.615 | 1.262 | CB tear |
| | 5f | 72 hours | 25.0 | 8.097 | 1.820 | Paper tear |
| Polypropylene | 5e | 20 min | 33.0 | 4.662 | 1.048 | Clean |
| | 5e | 1 hour | 33.0 | 4.745 | 1.067 | Clean |
| | 5e | 5 hours | 33.0 | 3.152 | 0.709 | Clean |
| | 5e | 24 hours | 33.0 | 0.237 | 0.053 | Clean |
| | 5e | 72 hours | 33.0 | 3.568 | 0.802 | Clean |
| | 5f | 20 min | 34.0 | 13.05 | 2.933 | Paper tear |
| | 5f | 1 hour | 34.0 | 13.34 | 2.998 | Paper tear |
| | 5f | 5 hours | 34.0 | 15.52 | 3.488 | Paper tear |
| | 5f | 24 hours | 34.0 | 14.38 | 3.233 | Paper tear |
| | 5f | 72 hours | 34.0 | 18.99 | 3.082 | Paper tear |

It was observed that such PSA characteristics exhibited by samples 5e and 5f can be maintained up to one week (see Table 12), and longer.

TABLE 12

Aging Effect on Tack of Activated Adhesive of Examples 5e and 5f
Average Force (Newton)

| Example | 30 min | 1 hour | 2 hours | 3 hours | 4 hours | 1 day | 2 days | 3 days | 4 days | 5 days | 1 week |
|---|---|---|---|---|---|---|---|---|---|---|---|
| 5e | 0.98 | 1.07 | 0.94 | 1.09 | 0.83 | 0.79 | 1.55 | 0.92 | 0.98 | 0.96 | 1.07 |
| 5f | 1.72 | 1.39 | 1.37 | 1.39 | 1.52 | 1.85 | 1.20 | 1.96 | 1.97 | 1.73 | 1.86 |

In this investigation, a set of samples designated as Example 5g were formed using a different type of solid plasticizers. Specifically, a different solid plasticizer, glyceryl tribenzoate supplied as UNIPLEX 260M by Unitex Corp., is used to replace the dicyclohexyl phthalate. Table 13 shows the composition of the adhesive for sample 5g.

TABLE 13

Adhesive Composition of Example 5g

| Materials | Parts |
|---|---|
| Base Polymer | 20 |
| U260M | 20 |
| TACOLYN 3400 | 20 |
| Water | 9 |
| IGEPAL CO-887 | 1 |

Figure 16:
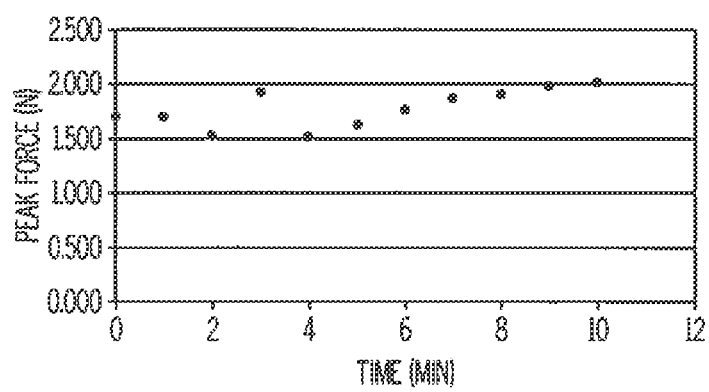
FIG. 16 is a graph illustrating short term aging effects on tack of an activated preferred embodiment adhesive according to the invention.

The coated adhesive on paper facestock was activated with NIR, followed by adhesion testing. Table 14 shows the results of 90° peel adhesion tests. The paper tear failure mode was achieved on all tested substrates. The short term and long term aging effects on adhesive open time are illustrated in FIG. 16 and Tables 14 and 15, respectively.

TABLE 14

90° Peel Test of Switchable Adhesive Example 5g with NIR Activation
90° Peel Test @ 12 ipm

| Substrate | Sample | Dwell Time | Coat-weight (g/m²) | (Newton/in) Average | (lbf/in) Average | Failure Mode |
|---|---|---|---|---|---|---|
| Glass | 5g | 20 min | 24.0 | 10.20 | 2.292 | Paper tear |
|  | 5g | 1 hour | 24.0 | 10.11 | 2.273 | Paper tear |
|  | 5g | 5 hours | 24.0 | 10.58 | 2.378 | Paper tear |
|  | 5g | 24 hours | 24.0 | 12.18 | 2.739 | Paper tear |
|  | 5g | 72 hours | 24.0 | 12.19 | 2.740 | Paper tear |
| Stainless Steel | 5g | 20 min | 24.0 | 10.78 | 2.423 | Paper tear |
|  | 5g | 1 hour | 24.0 | 10.77 | 2.422 | Paper tear |
|  | 5g | 5 hours | 24.0 | 10.42 | 2.342 | Paper tear |
|  | 5g | 24 hours | 24.0 | 10.44 | 2.347 | Paper tear |
|  | 5g | 72 hours | 24.0 | 12.00 | 2.698 | Paper tear |
| Cardboard | 5g | 20 min | 24.0 | 1.263 | 0.284 | CB fiber tear |
|  | 5g | 1 hour | 24.0 | 1.394 | 0.314 | CB fiber tear |
|  | 5g | 5 hours | 24.0 | 1.768 | 0.397 | CB fiber tear |
|  | 5g | 24 hours | 24.0 | 2.701 | 0.607 | CB tear |
|  | 5g | 72 hours | 24.0 | 3.855 | 0.867 | CB tear |
| Polypropylene | 5g | 20 min | 24.0 | 7.967 | 1.791 | Paper tear |
|  | 5g | 1 hour | 24.0 | 8.235 | 1.852 | Paper tear |
|  | 5g | 5 hours | 24.0 | 9.068 | 2.039 | Paper tear |
|  | 5g | 24 hours | 24.0 | 9.248 | 2.079 | Paper tear |
|  | 5g | 72 hours | 24.0 | 8.155 | 1.834 | Paper tear |

TABLE 15

Aging Effect on Tack of Activated Adhesive of Example 5g
Average Force (Newton)

| Example | 30 min | 1 hour | 2 hours | 3 hours | 4 hours | 1 day | 2 days | 3 days | 4 days | 5 days | 1 week |
|---|---|---|---|---|---|---|---|---|---|---|---|
| 5g | 2.04 | 1.93 | 1.82 | 1.83 | 1.82 | 1.75 | 1.69 | 1.87 | 1.82 | 1.83 | 1.86 |

Figure 17:
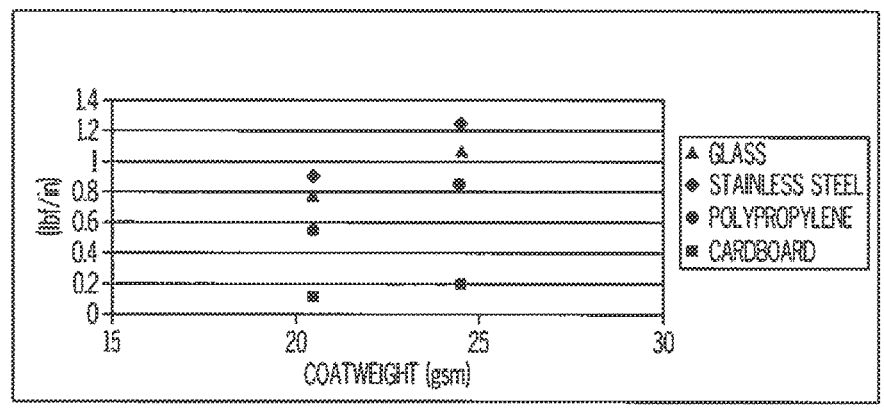
FIG. 17 is a graph of MWIR activated preferred embodiment adhesive using a high softening point tackifier.

In another investigation, a set of samples designated as Example 5h were prepared using a tackifier having a high softening point. Rosin ester emulsion, available under the designation "SUPER ESTER" E-650 (softening point 160° C.), is used to replace the TACOLYN 3400 in example 5f. SUPER ESTER E-650 is a polymerized rosin ester emulsion available from Arakawa Chemical Ind. of Osaka, JP. The formulated adhesive was coated on a 60# paper facestock, then dried at 50° C. for 10 minutes. MidWave IR or other heating activation is used for adhesive activation. FIG. 17 outlines the 90° peel test of Example 5h with two different adhesive coat weights.

In yet another investigation, the effect of coat weight upon adhesion properties was investigated. A set of samples designated as Example 5i were prepared as follows. Specifically, NIR to MidWave IR activatable adhesives were formulated in accordance with Example 5 in which a combination of anionic and nonanionic surfactants is used for the base polymer synthesis. The NIR to MidWave IR activated adhesive was made, and the adhesion test results of Example 5i adhesive with different adhesive coat weights on the selected substrates are listed in Table 16.

TABLE 16

90° Peel Adhesion Test of Example 5i
90° Peel Test @ 12 ipm

| Substrate | Coat weight (g/m$^2$) | (Newton/in) Average | (lbf/in) Average | Comments/ Failure Mode |
| --- | --- | --- | --- | --- |
| Glass | 19.2 | 5.772 | 1.298 | paper tear |
| Stainless Steel | | 8.290 | 1.864 | paper tear |
| Polypropylene | | 6.737 | 1.515 | paper tear |
| Cardboard | | 1.879 | 0.423 | some CB fiber tear |
| Glass | 25.6 | 5.109 | 1.149 | paper tear |
| Stainless Steel | | 6.725 | 1.512 | paper tear |
| Polypropylene | | 11.370 | 2.557 | paper tear |
| Cardboard | | 1.708 | 0.384 | some CB fiber tear |
| Glass | 31.6 | 7.908 | 1.778 | paper tear |
| Stainless Steel | | 12.152 | 2.732 | paper tear |
| Polypropylene | | 12.540 | 2.819 | paper tear |
| Cardboard | | 3.832 | 0.861 | CB tear |

Example 6 and Additional Investigations

Additional investigations were made as follows. A set of adhesive samples of the previously described adhesive system of Example 4 were prepared and the effect of dwell time on peel characteristics was reviewed. This set of samples is designated as Example 6a. Specifically, adhesive was coated on a paper facestock (Vellum Challenger H W by Crown Van Gelder N. V. of Velson-Noord, the Netherlands), and tested on different substrates. The activated samples were laminated on to the substrate 5 minutes after the activation (open time five minutes). Table 17 shows the results.

TABLE 17

90° Peel Test of Example 6a (5 Minutes Open Time)

| Substrate | Sample | Dwell Time | Coatweight (g/m$^2$) | (lbf/in) Average |
| --- | --- | --- | --- | --- |
| Polypropylene | 6a | 20 min | 25.0 | 0.938 |
| Stainless Steel | 6a | 20 min | 25.0 | 1.007 |
| Cardboard | 6a | 20 min | 25.0 | 0.406 |

Figure 18:
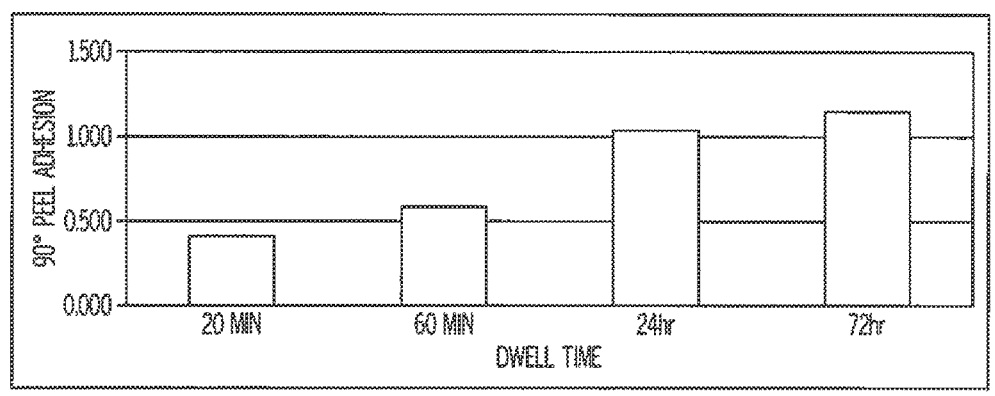
FIG. 18 is a graph illustrating effect of dwell time on adhesion of a preferred embodiment adhesive.

The adhesion of the adhesive increases with increasing dwell time. FIG. 18 illustrates the change of the 90° peel values of such adhesive on a cardboard substrate with dwell time. This data clearly shows that the adhesion becomes stronger until paper tear failure mode occurs.

Figure 19:
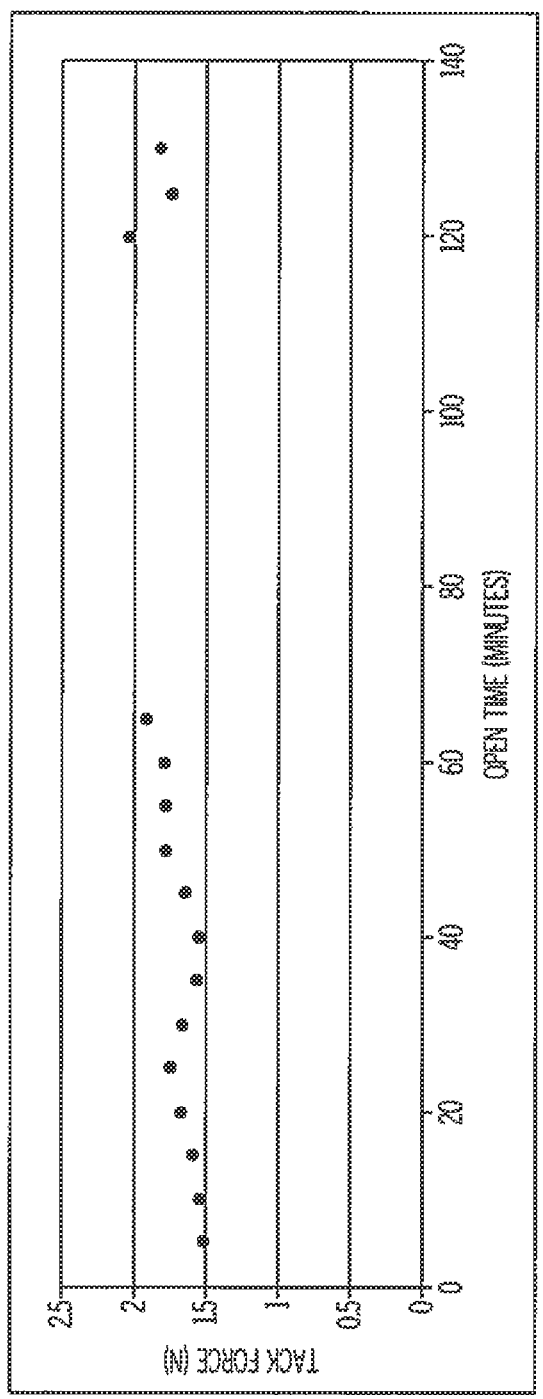
FIG. 19 is a graph illustrating effect of open time on the tack of a preferred embodiment adhesive.

In another set of investigations, a set of adhesive samples designated as sample 6b were prepared to investigate the effect of the open time of the adhesive. It is desirable for certain label applications that a pressure sensitive (PS) property will remain during the label lamination process, particularly, for high speed automatic label lamination processes. The various preferred embodiment adhesives exhibit a unique feature in which their pressure sensitive properties can be maintained for relatively long time periods once the adhesive is activated. In FIG. 19, a spherical probe adhesive tester (SPAT) is used for testing the tack of adhesive of Example 6. This data demonstrates that once the adhesive is activated, the tack of the adhesive or the PS property of the adhesive generally remains constant with time. This provides a benefit of allowing labels to be laminated on to a targeted substrate without the limit of open time.

The data presented in FIGS. 15, 16 and 19 obtained by the noted SPAT test, reveals that certain preferred embodiment adhesives exhibit initial peak tack values of from about 1.0 to about 2.0 Newtons, and typically from about 1.25 to about 1.75 Newtons. However, it will be appreciated by those skilled in the art that the adhesive formulations of the invention can be specifically tailored to exhibit initial peak tack values less than these or greater than these values.

Figure 20:
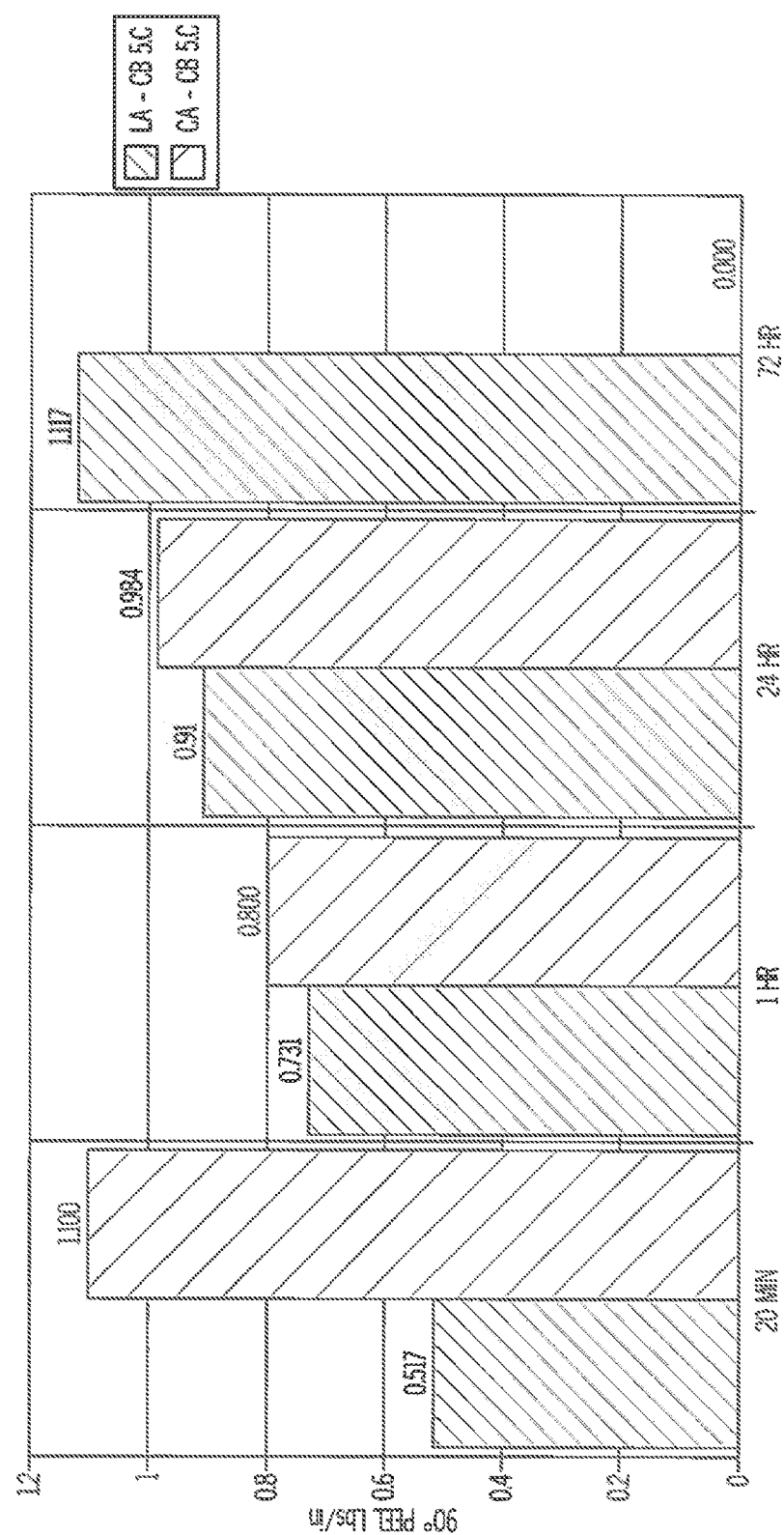
FIG. 20 is a graph illustrating the results of 90 degree peel tests at 5° C. using a preferred embodiment adhesive.

In another set of investigations, the adhesive system described in Example 4 was used in various peel tests at 5° C. as follows. Referring to FIG. 20, the adhesive of Example 4 designated as "LA" was applied to cardboard substrate samples and dwelled for varying time periods at 5° C. Four different time periods were used—20 minutes, 1 hour, 24 hours, and 72 hours. The adhesive was then activated, and the samples at 5° C. were then laminated with vellum or paper layers. The laminated samples were then subjected to 90° peel tests at 5° C. using a chambered Instron system. The laminated samples were compared to similarly treated and laminated samples formed using a conventional adhesive commercially available from Avery Dennison Corporation and designated as "CA." As can be seen in FIG. 20, the samples using the preferred embodiment adhesive noted from Example 4 exhibited generally consistently stronger adhesive characteristics as compared to the samples using the conventional adhesive. In addition, the preferred adhesive exhibited predictable increased adhesive performance with increased dwell times.

Figure 21:
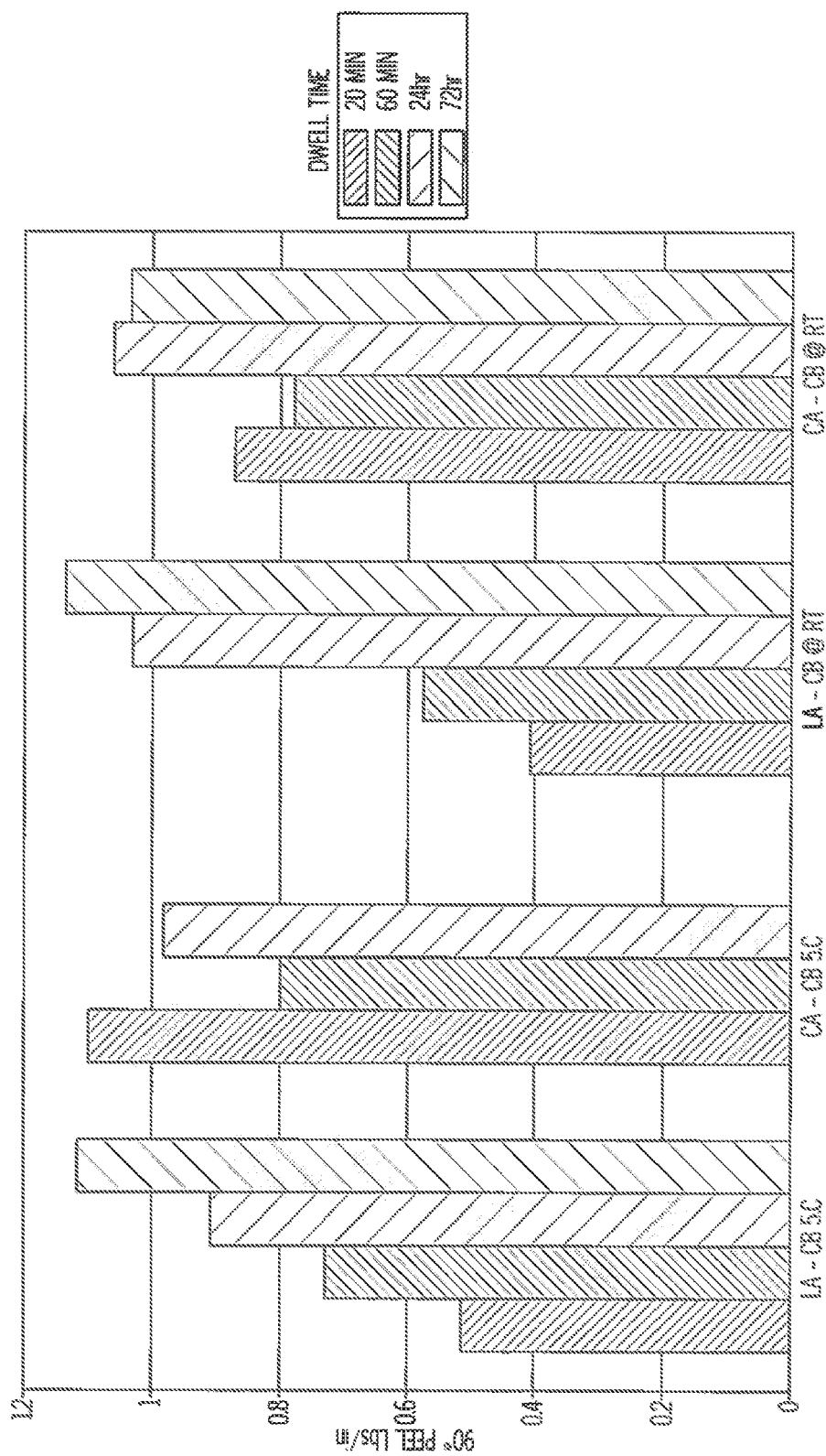
FIG. 21 includes plots illustrating 90 degree peel tests using the adhesive referenced in FIG. 20, in which the peel tests were performed at 5° C. and at room temperature.

FIG. 21 illustrates results from similar 90° peel tests of the two sets of samples, however, also illustrates 90° peel tests performed at room temperature (right hand side). As evident in FIG. 21, the laminated samples using the preferred adhesive described in Example 4 exhibited consistent and increasing adhesive characteristics as dwell time increased, at both 5° C. and at room temperature. These results demonstrate the applicability and capabilities of the preferred adhesives for a wide array of different end use applications.

Further investigations were conducted to review blocking of coated adhesives. The various preferred embodiment adhesives exhibit good anti-blocking properties which will meet the requirements associated with most application processes. The previously described coated adhesive on paper facestock was tested under different pressures. Table 18 indicates that no blocking was observed under the noted conditions.

TABLE 18

Blocking Test

| Temperature (° C.) | Pressure (psi) | Rating |
|---|---|---|
| 45 | 20 | Excellent |
| 45 | 30 | Good |

This data demonstrates that certain classes of the preferred embodiment adhesives exhibit blocking-free properties or essentially so, under a temperature of 45° C. and a pressure of from about 20 to about 30 psi (approximately 137,895 Newton/m² to 206,842 Newton/m²). It is contemplated that these non-blocking properties are also exhibited at relative humidity (RH) percentages of from 10% to 99%. These anti-blocking properties provide a significant feature for the adhesives and enable them to be used in a wide array of applications such as labeling. More particularly, it is preferred that the adhesives exhibit these non-blocking properties before activation and most preferably, concurrently. That is, certain preferred adhesives exhibit all of these properties, i.e. non-blocking at a temperature of 45° C., non-blocking at a pressure of from 15 psi to 30 psi, and non-blocking at a relative humidity level from 10% to 90%.

Clarity of the preferred embodiment adhesives was also investigated as follows. Surprisingly, a preferred embodiment adhesive remains clear or in a generally transparent state after activation, even after heat is removed for months or longer. This unique feature of the adhesive permits using the adhesive in applications where a clear or transparent adhesive is needed, such as in a clear film label or graphic application. A preferred embodiment adhesive was coated on a PET film at 13 gsm under standard coating conditions. The dried adhesive appears white or translucent in color. Upon activating the adhesive with heat, the adhesive turns clear and exhibits pressure sensitive properties. Laminating this film label on a transparent substrate such as glass shows that the adhesive will remain clear. The clarity of the film substrate is measured with an optical measuring device available under the designation Haze-Gard Plus by Gardner. Suitable Haze-Gard Plus instruments are also available from Qualitest USA of Plantation, Fla. This instrument measures light transmittance, haze, and other properties according to ASTMD1003D1044. Table 19 demonstrates that the haze of the label changes dramatically before and after the activation. Meanwhile, it is noticed that the haze of the laminated film label generally continually decreases over time. It is believed that the melted plasticizer diffuses inside the base polymer matrix, and upon uniform distribution, yields a clear adhesive coating. Such clarity of the activated adhesive will remain for a prolonged period of time.

TABLE 19

Clarity of Film Label With an Activated Adhesive

| Sample | Haze (%) |
|---|---|
| Label before activation | 92.37 |
| Activated label after different dwell time (hr) | |
| 0.3 | 5.46 |
| 1 | 4.94 |
| 6 | 5.17 |
| 72 | 1.77 |

Referring to Table 19, the haze for a PET film by itself is about 1%. These results indicate another feature of the preferred embodiment adhesives relating to their optical clarity after activation. Generally, the preferred embodiment adhesives exhibit an optical clarity after activation characterized by relatively low levels of haze. Generally, after activation, the adhesives exhibit haze levels of less than 10%, more preferably less than 8%, more preferably less than 6%, more preferably less than 4%, more preferably less than 2%, and most preferably less than 1%. The foregoing is with regard to adhesives that are generally free from pigments, colorants, dyes, inks, or the like. As previously noted, the present invention includes in certain embodiments, adhesives that are free of such components.

In yet another series of investigations, carbon black was incorporation into various layers of a label assembly. The label assemblies were then activated as described herein. Temperature measurements were obtained. As demonstrated in the results set forth below, labels containing carbon black, regardless of the particular layer location, reached higher temperatures than a control label that was free of carbon black in any layer.

Specifically, label assemblies having primer layers and adhesive layers received carbon black as set forth below in Table 20.

TABLE 20

Comparing Carbon Black (CB) Placed in Different Layers of a Label Assembly

| Samples | Power % | Speed | Act Time | First Run | 2nd Run | 3rd Run | 4th Run |
|---|---|---|---|---|---|---|---|
| Primer with 0.1% CB | 100 | 4.0 (10.5 ips) | 0.53 s | 108 | 101 | 95 | 104 |
| Primer with 0.2% CB | 100 | 4.0 (10.5 ips) | 0.53 s | 112 | 106 | 101 | 112 |
| Only Adhesive with CB | 100 | 4.0 (10.5 ips) | 0.53 s | 112 | 105 | 100 | 109 |
| No CB in any layer | 100 | 4.0 (10.5 ips) | 0.53 s | 95 | 85 | 90 | 93 |

Figure 22:
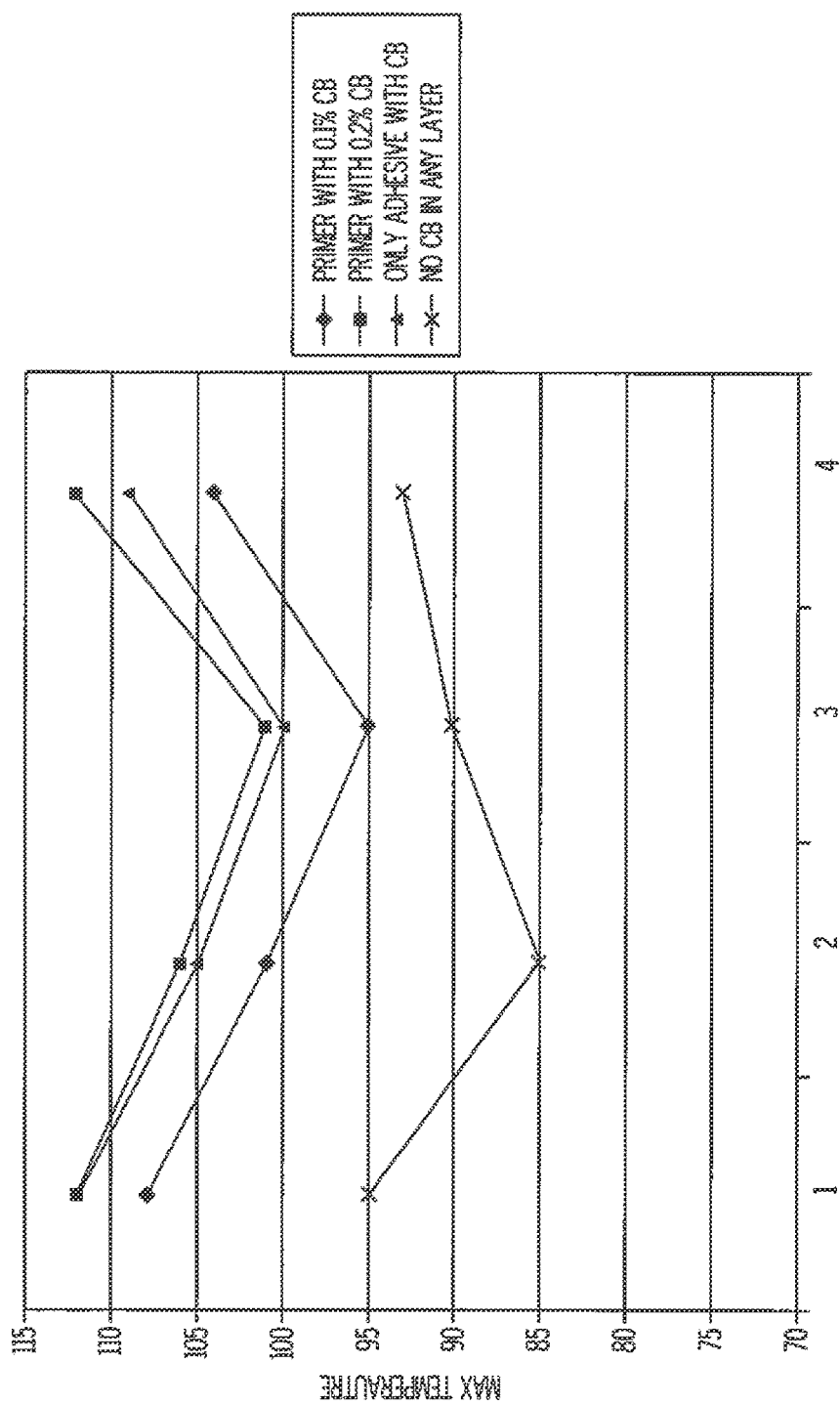
FIG. 22 is a graph illustrating maximum temperatures of label assemblies containing carbon black compared to a label assembly free of carbon black, resulting after exposure to radiation.

Each sample and the control (free of carbon black) was exposed to energy emitting lamps, all set at the same power output. Each sample and the control were moved past the emitters past the emitters at the same rate thereby achieving the same activation time for all samples and control. Maximum temperatures reached by the labels were measured for four trials. The results are graphically illustrated in FIG. 22.

The results of this investigation reveal that incorporation of carbon black, even at relatively low concentration levels of 0.1% and 0.2%, resulted in significantly higher temperatures occurring in the labels.

With respect to the previously noted testing, the following procedures were followed for the noted measurements or evaluations.

Peel Adhesion

The adhesive was coated at an approximate coat weight in the specified range of 20 gsm to 40 gsm onto the selected paper facestock. A barrier coating is coated on the paper if needed. The coated materials are dried at 50° C. for 10 minutes. The resulting construction was die-cut into 25×204 mm (1×8 inch) sized strips. The strips were then subjected to an activation thermally via MidWave IR, and applied centered along the lengthwise direction to 50×152 mm (2×6 inch) brightly annealed, highly polished stainless steel test panels, or a paper cardboard, and rolled down using a 2 kg (4.5 lb), 5.45 pli 65 shore "A" rubber-faced roller, rolling back and forth once, at a rate of 30 cm/min (12 in/min). The samples were conditioned for either 20 minutes or 24 hours in a controlled environment testing room maintained at 23° C. (73° F.) and 50% relative humidity. After conditioning, the test strips were peeled away from the test panel in an Instron Universal Tester according to a modified version of the standard tape method Pressure-Sensitive Tape Council, PSTC-1 (rev. 1992), Peel Adhesion for Single Coated Tapes 180° Angle, where the peel angle was either 180° or 90°, i.e., perpendicular to the surface of the panel, at a rate of 30 cm/min (12 in/min). The force to remove the adhesive test strip from the test panel was measured in lbs/in. All tests were conducted in triplicate.

Loop Tack

Loop tack measurements were made for samples cut to 25×204 mm (1×8 inch) sized strips which is subsequently heat activated with MWIR radiation. Stainless steel or glass is used as the substrate at a withdraw rate of about 305 mm/min (12 in/min), according to standard test 1994 TLMI Test L-IB2, TLMI Loop Tack Test, by the Tag and Label Manufacturers Institute Inc. (TLMI), using an Instron Universal Tester Tester Model 4501 from Instron (Canton, Mass.). Loop tack values were taken to be the highest measured adhesion value observed during the test. All tests were conducted in triplicate.

ARC SPAT Test (For Tack)

The SPAT test was developed by Avery Dennison Research Center. Generally, this test procedure is as follows:

Samples are prepared by applying a double side coated tape FT530 available from Avery Dennison onto a 1/36 inch aluminum panel. The tape is rolled down twice with a 14.5 pound roller. The liner of the double sided tape is then removed. A sample is then positioned face down onto the exposed double coated tape. The sample and tape pieces were rolled down twice using the 14.5 pound roller. The rolled samples were then subjected to a 20 minute dwell period before testing. The remaining release liners were then removed prior to testing.

Machine set up was performed as follows. Texture Analyzer TA.XT2i from Texture Technologies of New York, N.Y. was used. A SPAT tester with 1 inch diameter stainless steel probe was used to perform analysis with a test speed at 0.04 mm/sec, compressive force at 4.5 Newtons, and contact time of 0.01 sec.

Additional details concerning SPAT test procedures are described in Chuang H K; Chiu C.; Paniagua R. *Avery Adhesive Test yields more performance data than traditional probe*, Adhesives Age (10) 1997, 18-23.

Failure Modes

The following adhesive failure modes were observed for some samples: "panel failure" (p)—the adhesive construction detached from the panel cleanly, without leaving a residue; "panel staining" (ps), —the adhesive construction detached cleanly, but left a faint stain or "shadow" on the panel; "high panel staining (hps)—the adhesive construction left a markedly noticeable stain on the panel; "cohesive failure" (c)—the adhesive construction split apart, leaving adhesive residue on the test panel and the facestock; "facestock failure" (fs)—the adhesive completely detached from the facestock, and transferred to the test panel; "zippy" (z)—the adhesive construction detached from the panel with a slip-stick, jerky release; and "mixed"-mixed failure modes.

Definition of PSA and Non-PSA

Both rubber-based and acrylic-based PSAs are known. In 1966, C. Dalquist identified a 1 second creep compliance greater than $1 \times 10^{-6}$ cm$^2$/dyne as the efficient contact criterium of a good PSA. A more recent discussion of PSAs in the *Handbook of Pressure Sensitive Adhesive Technology* (2d Edition), D. Satas, ed. (1989), (hereafter, "*Handbook*"), pages 172-176, incorporated by reference herein, identifies glass transition temperature ($T_g$) and modulus (G') at the application (use) temperature as the most important requirements for PSA performance. Both properties are a function of the identities and amounts of monomers that comprise the PSA polymer(s). Thus, poly(acrylic acid) is not a PSA, but a copolymer of acrylic acid with high mole % of 2-ethyl-hexyl acrylate is.

The typical values of G' and $T_g$ for label and tape PSAs are described in the *Handbook*. For a tape, G' at room temperature is approximately $5 \times 10^5$ to $2 \times 10^6$ dyne/cm$^2$, and $T_g$ is approximately −15° C. to 10° C.; while labels have a lower value of G' at room temperature, i.e., about $2 \times 10^5$ to $8 \times 10^5$ dyne/cm$^2$. $T_g$ requirements for cold temperature, permanent, and removable applications are different, as is known in the art. Thus, cold temperature label PSAs generally require a $T_g$ of from about −30° C. to −10° C.

All patents, published applications, and articles noted herein are hereby incorporated by reference in their entirety.

It will be understood that any embodiment, aspect, or detail thereof can be used with any other embodiment, aspect, or detail thereof described herein. Thus, the various adhesive systems and adhesive base polymers described herein can be used in conjunction with any of the labels, label assemblies, systems, and methods described herein.

The invention has been described and illustrated by exemplary and preferred embodiments, but is not limited thereto. Persons skilled in the art will appreciate that variety of modifications can be made without departing from the scope of the invention, which is limited only by the claims. Throughout the text and the claims, use of the word "about" in relation to a range of numbers is intended to modify both the low and the high values stated.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A label assembly comprising a facestock layer and a heat activatable adhesive layer, and a functional coating layer disposed between the adhesive layer and the facestock layer, wherein the heat activatable adhesive layer comprises:
  20 to 35 wt % of a base polymer including at least one lower alkyl acrylate selected from the group consisting of methyl acrylate, ethyl acrylate, butyl acrylate and 2-ethylhexyl acrylate, styrene, methyl methacrylate, methacrylic acid, acrylic acid, at least one multifunctional monomer, and
at least one chain transfer agent,
wherein the concentrations of the above components of the base polymer are:
12 to 48 wt % of the at least one lower alkyl acrylate,
23 to 78 wt % of styrene,
3 to 30 wt % of methyl methacrylate,
1 to 2 wt % of methacrylate acid,
1 to 3 wt % of acrylic acid,
0.5 to 2.5 wt % of the at least one multifunctional monomer, and
1.0 to 4.0 wt % of the at least one chain transfer agent,
50 to 75 wt % of a plasticizer, and
5 to 20 wt % of a tackifier.

2. The label assembly of claim 1 wherein the facestock layer includes paper or a polymeric film, and the functional coating layer includes at least one of a barrier material, a primer material, and a reflective material.

3. The label assembly according to claim 1, wherein the adhesive base polymer has a weight average molecular weight within a range of from 10,000 Daltons to 150,000 Daltons.

4. The label assembly according to claim 1, wherein the adhesive base polymer has a glass transition temperature Tg above 25° C., wherein the plasticizer has a melting point above 40° C., and wherein the tackifier has a melting point in a range from 50° C. to 120° C.

5. The label assembly according to claim 1, wherein the plasticizer comprises a benzoate compound selected from the group consisting of glyceryl tribenzoate, 1,4-cyclohexane dimethanol dibenzoate, and combinations thereof.

6. The label assembly according to claim 1, wherein the plasticizer comprises glyceryl tribenzoate.

7. A label comprising:
a facestock layer; and
an activatable, polymerized adhesive layer that is coupled to the facestock layer and includes:
i. 20 to 35 wt % of an adhesive base polymer comprising butyl acrylate, styrene, methyl methacrylate, methacrylic acid, acrylic acid, at least one multifunctional monomer, and at least one chain transfer agent,
ii 50 to 75 wt % of a plasticizer comprising a benzoate compound, and
iii. 5 to 20 wt % a tackifier.

8. The label according to claim 7 wherein:
the label is configured to be exposed to a radiant energy;
the radiant energy has a wavelength and an intensity that results in the adhesive layer becoming tacky after exposure to the radiant energy; and
the facestock layer is not discolored after the exposure of the label to the radiant energy.

9. The label according to claim 7 wherein the facestock layer is made of a material selected from the group consisting of a paper, a polymer film, a metallized paper, a paper backed foil, and a metal foil.

10. The label according to claim 7, wherein the adhesive base polymer has a weight average molecular weight within a range of from 10,000 Daltons to 150,000 Daltons.

11. The label assembly according to claim 7, wherein the adhesive base polymer has a glass transition temperature Tg above 25° C., wherein the plasticizer has a melting point above 40° C., and wherein the tackifier has a melting point in a range from 50° C. to 120° C.

12. The label according to claim 7, wherein the benzoate compound is selected from the group consisting of glyceryl tribenzoate, 1,4-cyclohexane dimethanol dibenzoate, and combinations thereof.

13. The label according to claim 7, wherein the benzoate compound comprises glyceryl tribenzoate.

14. Use of the label assembly of claim 1 in a printer.

15. Use of the label of claim 7 in a printer.

* * * * *